(12) United States Patent
Gyllenskog et al.

(10) Patent No.: US 12,282,675 B2
(45) Date of Patent: Apr. 22, 2025

(54) COPY COMMAND FOR A MEMORY SYSTEM

(71) Applicant: Micron Technology, Inc., Boise, ID (US)

(72) Inventors: Christian M Gyllenskog, Meridian, ID (US); Luca Porzio, Casalnuovo (IT)

(73) Assignee: Micron Technology, Inc., Boise, ID (US)

( * ) Notice: Subject to any disclaimer, the term of this patent is extended or adjusted under 35 U.S.C. 154(b) by 191 days.

(21) Appl. No.: 17/717,762

(22) Filed: Apr. 11, 2022

(65) Prior Publication Data

US 2022/0342553 A1 Oct. 27, 2022

Related U.S. Application Data

(60) Provisional application No. 63/180,441, filed on Apr. 27, 2021.

(51) Int. Cl.
*G06F 3/06* (2006.01)

(52) U.S. Cl.
CPC ............ *G06F 3/065* (2013.01); *G06F 3/0616* (2013.01); *G06F 3/064* (2013.01); *G06F 3/0679* (2013.01)

(58) Field of Classification Search
None
See application file for complete search history.

(56) References Cited

U.S. PATENT DOCUMENTS

2018/0089099 A1\* 3/2018 Raj .......................... G06F 12/10
2020/0342941 A1\* 10/2020 Tokiwa ............... G11C 11/5642

\* cited by examiner

*Primary Examiner* — Michael Alsip
(74) *Attorney, Agent, or Firm* — Holland & Hart LLP

(57) ABSTRACT

Methods, systems, and devices for copy command for a memory system are described. A method may include storing, within a memory system, data associated with one or more first addresses within an address space. The method may further include receiving a copy command for the data from a host for the memory system. The memory system may associate, in response to the copy command, the data with one or more second addresses within the address space.

28 Claims, 10 Drawing Sheets

COPY COMMAND FOR A MEMORY SYSTEM

CROSS REFERENCE

The present Application for Patent claims priority to U.S. Provisional Patent Application No. 63/180,441 by Gyllenskog et al., entitled "COPY COMMAND FOR A MEMORY SYSTEM" and filed Apr. 27, 2021, which is assigned to the assignee hereof and is expressly incorporated by reference in its entirety herein.

FIELD OF TECHNOLOGY

The following relates generally to one or more systems for memory and more specifically to copy command for a memory system.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
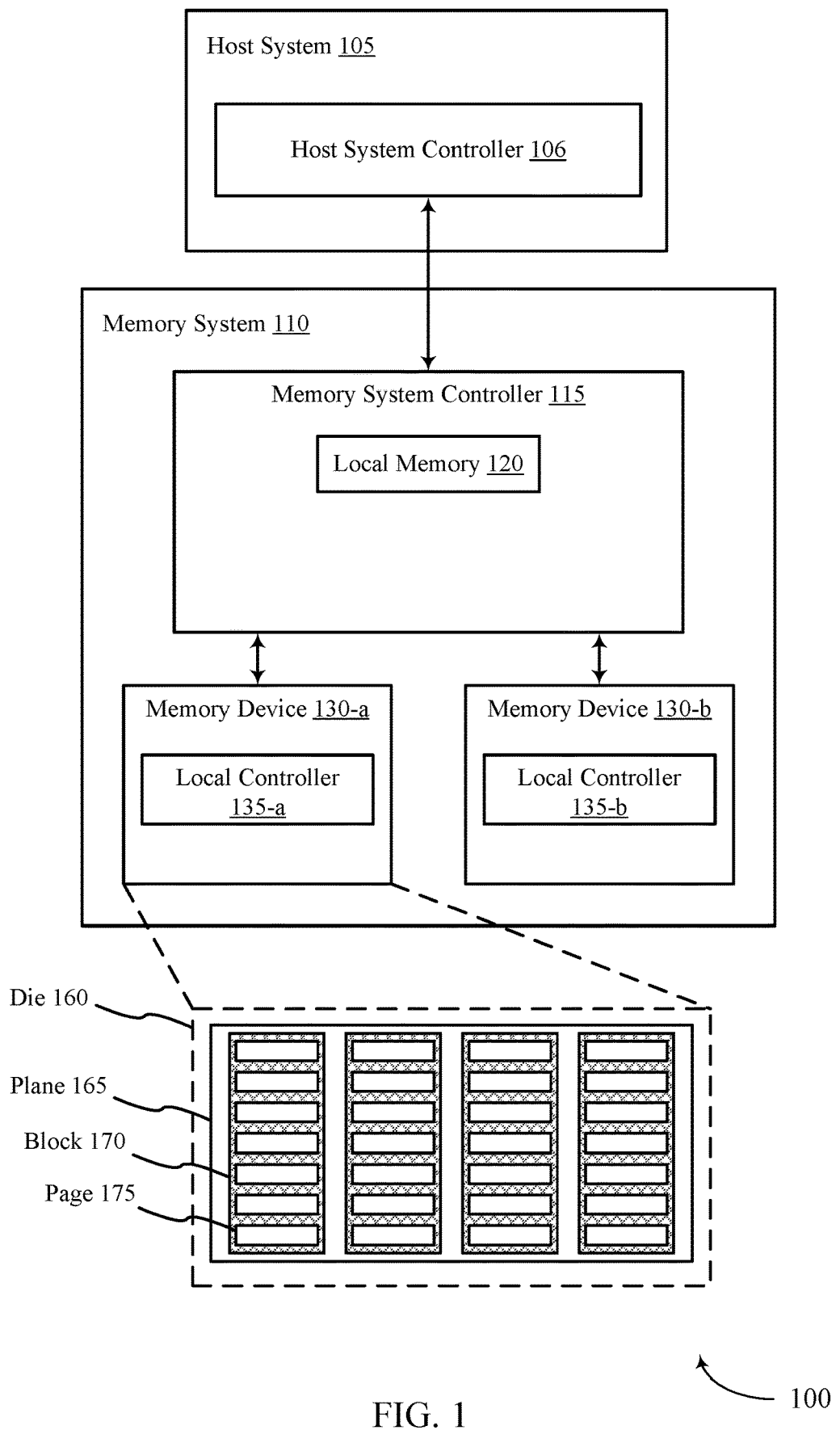
FIG. 1 illustrates an example of a system that supports a copy command for a memory system in accordance with examples as disclosed herein.

A memory system may be used to store data for a host system in an electronic system. In some examples, the host system may reference data stored by the memory system using addresses within an address space. The addresses referenced by the host system (e.g., used by the host system to identify the data subject to associated commands, such as read or write commands) may be referred to as logical addresses, and the address space that includes the logical addresses may be referred to as a logical address space.

In some instances, the host system for a memory system may determine to copy data from a first address (e.g., a first location or source location) to a second address (e.g., a second location or destination location) with an address space (e.g., a logical address space). In some memory systems, to accomplish such copying, the host system may transmit a read command for the data to the memory system (e.g., a read command that references or is otherwise associated with the first address). The memory system may read the data from a first storage location within the memory system associated with the first address and transmit the data to the host system (e.g., via an interface external to the memory system and coupled with the host system) in response to the read command. The host system may then transmit the data back to the memory system (e.g., via the same external interface), along with an associated write command for the memory system to write the data to a second storage location within the memory device associated with the second address (e.g., a write command that references or is otherwise associated with the second address). The memory system may write the data to the second address based on receiving the write command. In some cases, the host system may further perform various processing on the data between receiving the data from and send the data back to the memory system (e.g., decryption followed by re-encryption, decoding followed by re-encoding, or the like). Transmitting the data between the host system and memory system (e.g., via an external interface) repeatedly copy the data from the first address to the second address may increase latency and reduce system performance. That is, the memory system may perform several read and write operations and transmit and receive the data externally to and from the host system multiple times in order to move or copy the data from the first location to the second location.

Systems, techniques, and devices are described herein for a copy command transmitted by a host system to a memory system to copy data associated with a first address to a second address by associating the data with the second location. For example, the memory system may store data associated with a first logical block address (e.g., LBA) and associate the data with a second LBA in response to receiving the copy command from the host system. In some cases, the memory device may not send the data to the host system (e.g., may not be sent over an interface external to the memory system) in connection with executing the copy command. In some such examples, the memory system may also retain the association of the data with the first address.

In some examples, the memory system may associate the data with the second address by reading data from the first address and writing the data to the second address, but without sending the data to the host device or receiving the data from the host device in connection with the copy command. That is, the memory system may copy the data from a first physical location in the memory system to a second physical location in the memory system in response to the copy command.

Additionally or alternatively, in some examples, the memory system may associate the data with the second address by updating one or more mapping tables within the memory system. For example, the memory system may add an entry to a logical to physical table (L2P table) indicating a second LBA is also associated with the data—e.g., the second LBA may be additionally associated with the physical location storing the data. In such examples, the memory system may retain the association of the first LBA address to the data in the L2P table. Additionally, the memory system may also maintain a second table that associates the first LBA with the second LBA—e.g., the second table may indicate to the memory system that the data associated with the first LBA is also associated with the second LBA or vice versa.

Thus, in response to a copy command as described herein for data associated with a first address, a memory system may copy the data by associating the data with a second address without transmitting data back and forth with the host system. That is, the memory system may copy the data without transmitting data from a first address to the host system in response to a read command and receiving the same data to write to a second address in response to a write command. Accordingly, techniques as described herein may reduce latency and increase the overall performance of the system (e.g., by reducing an amount of processing overhead or time for the host associated with copying the data, by reducing or eliminating an amount of signaling overhead over one or more interfaces between the host system and the memory system, or by virtue of other benefits that may be appreciated by one of ordinary skill in the art) associated with copying data within an address space.

Features of the disclosure are initially described in the context of systems, devices, and circuits with reference to FIG. 1. Features of the disclosure are described in the context of a copy command, copy parameter list, copy block descriptor, and systems with reference to FIGS. 2-6. These and other features of the disclosure are further illustrated by and described in the context of an apparatus diagram and flowchart that relate to copy command for a memory system with reference to FIGS. 7-10.

FIG. 1 illustrates an example of a system 100 that supports a copy command for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface (e.g., an external interface, which may be at least partially external to the memory system 110). The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support copy command for a memory system. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

As described herein, the host system 105 may transmit a copy command to the memory system 110 that enables the memory system 110 to copy data associated with a first location by associating the data with a second location (e.g., without the data passing externally between the memory system 110 and the host system 105, such as via a physical host interface). For example, the memory system 110 may store data associated with a first LBA and, in response to the copy command, associate the data with a second LBA. In examples, the memory system 110 may associate the data with the second LBA by internally reading the data from the first LBA and writing the data to the second LBA. In other examples, the memory system 110 may associate the data with the second location by updating a mapping table (e.g., L2P table) and associating a second LBA with a physical address associated with the data and the first LBA—e.g., by associating a second LBA with the same physical address as the first LBA with a new entry in the L2P table. By utilizing a copy command and internally copying the data, the memory system 110 may reduce latency and power consumption.

Figure 2:
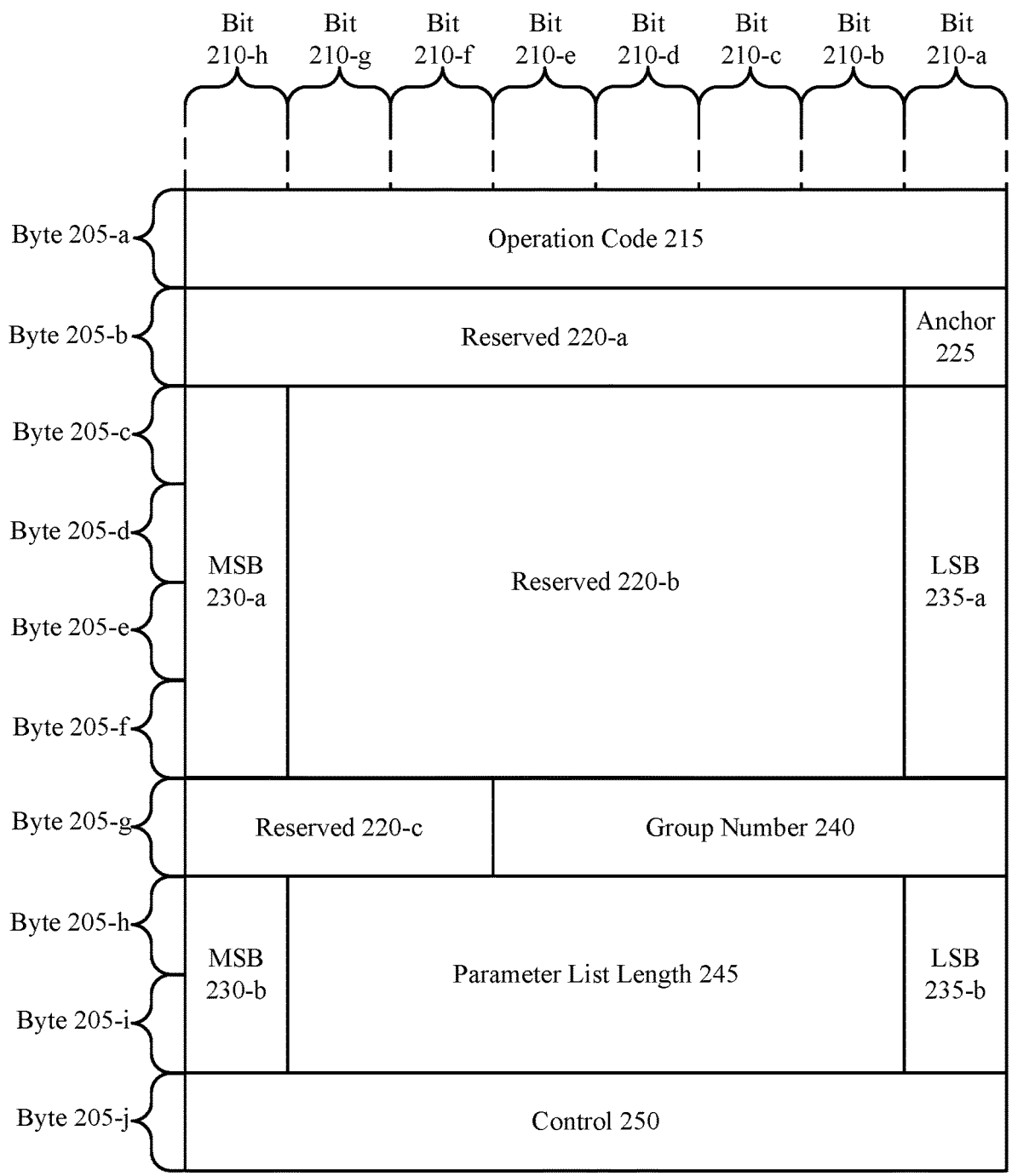
FIG. 2 illustrates an example of a copy command that illustrates a copy command for a memory system in accordance with examples as disclosed herein.

FIG. 2 illustrates an example of a copy command 200 that supports a copy command for a memory system in accordance with examples as disclosed herein. Copy command 200 may be transmitted by a host system (e.g., host system 105 as described with reference to FIG. 1) to a memory system (e.g., memory system 110 as described with reference to FIG. 1). The copy command 200 may include a quantity of bytes 205 (e.g., byte 205-$a$ through byte 205-$j$). The copy command 200 may also include bits 210-$a$ through 210-$h$—e.g., each byte 205 of the command 200 may include eight (8) bits 210. In some examples, a copy command as described herein (e.g., the copy command 200) may be specified by a standard related to communications with or by a memory system (e.g. a UFS standard or other standard).

In some examples, a host system (e.g., host system 105 as described with reference to FIG. 1) may issue a copy command 200 to a memory system (e.g., memory system 110 as described with reference to FIG. 1). In some examples, the memory system may be an example of a UFS device. In some cases, the memory system may be an example of a managed NAND system (e.g., mNAND system). In such examples, the memory system may receive the copy command 200 at an mNAND system controller (e.g., memory system controller 115 as described with reference to FIG. 1). The memory system may associate data stored at a first address to a second address as described with reference to FIGS. 5 and 6 in response to the copy command 200. In some instances, the memory system may transmit a response to the copy command 200. In such examples, the response transmitted by the memory system may indicate to the host system that the memory system is ready to receive a copy parameter list as described with reference to FIG. 3, where the copy parameter list may be associated with the copy command 200. Additionally, the copy command 200 may include an operation code 215, reserved 220, anchor 225, most significant bits (MSB) 230, least significant bits (LSB) 235, group number 240, parameter list length 245, and control 250.

Operation code 215 may be configured to be a unique operation code that is specific to copy commands such as the copy command 200. That is, the operation code 215 may be a unique code that indicates the command received by the memory system is a copy command 200 (e.g., the operation code 215 may not be included as an operation code in any commands that are not copy commands). In some examples, the operation code 215 may be received in the first byte 205-$a$.

Reserved 220 may be configured to indicate bits that are reserved for future use. That is, reserved 220-$a$, reserved 220-$b$, and reserved 220-$c$ may include bits 210 that are currently not associated with any operation or function but could later be defined and associated with an operation or function. In some examples, bits 210 associated with reserved 220-$a$ may be transmitted in byte 205-$b$, bits 210 associated with reserved 220-$b$ bits may be transmitted in bytes 205-$c$ through 205-$f$, and bits 210 associated with reserved 220-$c$ may be transmitted in byte 205-$g$. In some examples, bytes 205-$c$ through 205-$f$ transmitting reserved 220-$b$ may also include an MSB 230-$a$ and LSB 235-$a$. That is, a bit 210-$a$ associated with bytes 205-$c$ through 205-$f$ may be an LSB 235-$a$ and a bit 210-$h$ associated with bytes 205-$c$ through 205-$f$ may be an MSB 230-$a$.

Anchor 225 may be configured to be associated with a value 0b in a UFS device. In some examples, if the anchor 225 is associated with a value one (1), the memory system may terminate the copy command 200—e.g., with check condition status with the sense key set to illegal request and the additional sense code set to invalid field[1]. That is, if the memory system receives a copy command 200 with the anchor 225 value set to a one (1), the memory system may terminate the command. In some examples, the anchor 225 may be transmitted as bit 210-*a* in byte 205-*b*.

[1]*JDEC Standard.* JESD220E. JEDEC Solid State Technology Association, 2020.

Group number 240 may be configured to indicate to the device a system data tag or whether the data is associated with a contextID. For example, the group number 240 may match storage characteristics with system data characteristics. In some examples, the copy command 200 may include a group number 240 value of "00000b." In some cases, if the group number 240 is set to a reserved value, the operation may fail. In some examples, the group number 240 may be transmitted in byte 205-*g* utilizing bits 210-*a* through 210-*e*.

Parameter list length 245 may be configured to indicate a length of a list of copy parameters to be transmitted to the memory system. That is, the host system may transmit the list of copy parameters to the memory system after transmitting the copy command 200 as described with reference to FIG. 3. The copy command 200 may include the parameter list length 245 to indicate the length (e.g., in bytes) of the associated (e.g., subsequently transmitted) list of copy parameters. In some examples, the parameter list length 245 may be transmitted in bytes 205-*h* through 205-*i*. In some cases, the parameter list length 245 may include an MSB 230-*b* and an LSB 235-*b*—e.g., bits 210-*h* and 210-*a* of byte 205-*g* and 205-*i* may be MSB 230-*b* and LSB 235-*b*, respectively.

Control 250 may be configured to indicate the end of the copy command 200. That is, the control 250 may be a flag that indicates to the memory system that the copy command 200 has been fully transmitted. In some cases, the control 250 may have a value "00h." In some cases, the control 250 may be transmitted in the byte 205-*j*—e.g., the last byte 205 of the copy command 200.

Figure 3:
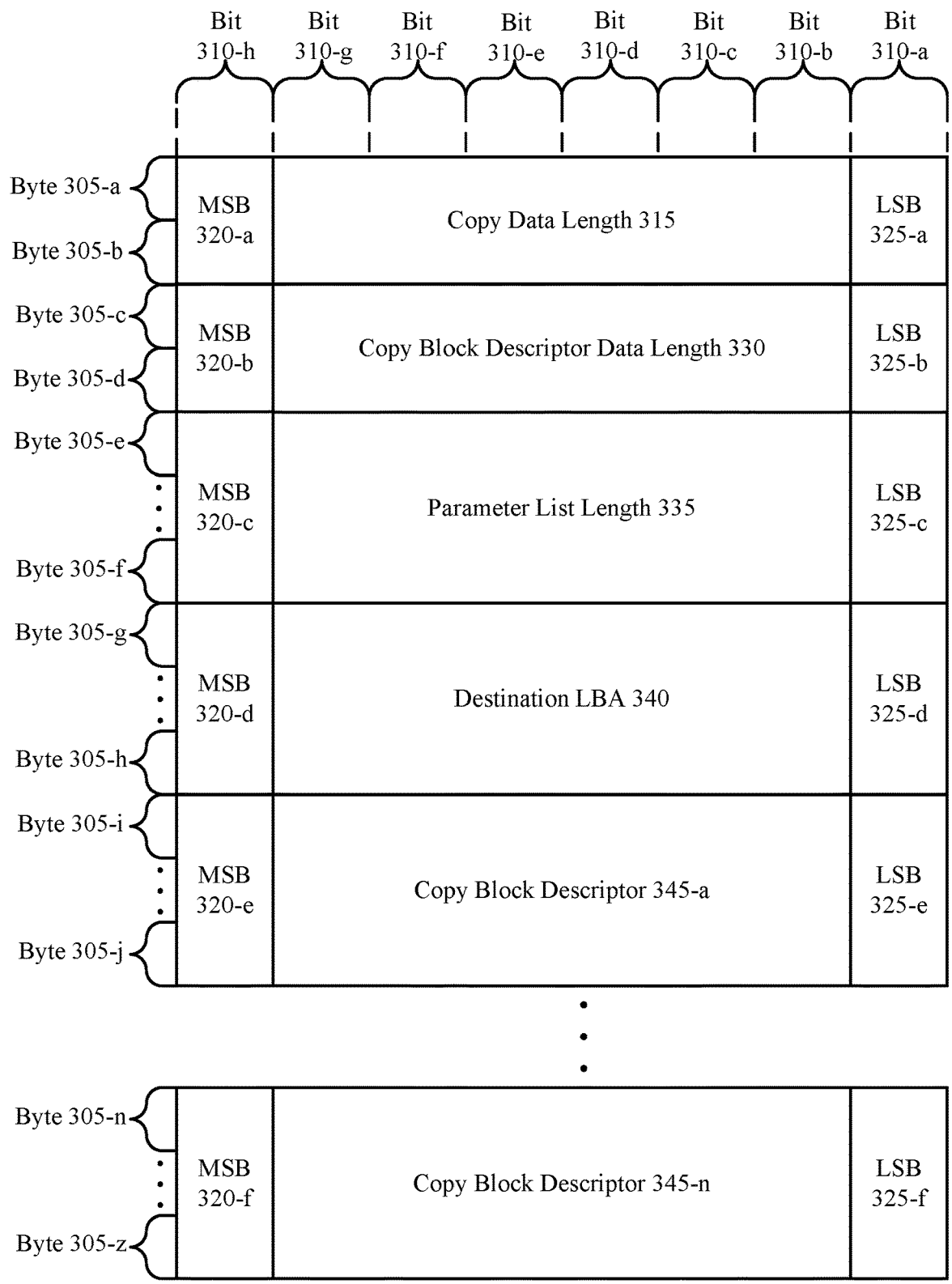
FIG. 3 illustrates an example of a copy parameter list that supports a copy command for a memory system in accordance with examples as disclosed herein.

FIG. 3 illustrates an example of a copy parameter list 300 that supports a copy command for a memory system in accordance with examples as disclosed herein. In some examples, a host system (e.g., host system 105 as described with reference to FIG. 1) may transmit the copy parameter list 300 after transmitting a copy command (e.g., copy command 200 as described with reference to FIG. 2). In such examples, a memory system (e.g., memory system 110 as described with reference to FIG. 1) may receive the copy parameter list 300 at a memory system controller (e.g., memory system controller 115 as described with reference to FIG. 1). The copy parameter list 300 illustrated in FIG. 3 may include bytes 305-*a* through 305-*z*. It should be noted, a quantity of bytes 305 is illustrated for example purposes only and the copy parameter list 300 may include more or less bytes 305 than shown in FIG. 3. Each byte 305 may further include bits 310-*a* through 310-*h*. Each byte 305 may also have a MSB 320 and a LSB 325. For example, byte 305-*a* may include a MSB 320-*a* associated with bit 310-*h* and a LSB 325-*a* associated with bit 310-*a*. The copy parameter list 300 may include a copy data length 315, a copy block descriptor data length 330, reserved 335, destination LBA 340, and copy block descriptors 345.

Copy data length 315 may be configured to indicate a quantity of information included in the copy parameter list 300 excluding the copy data length 315 itself. For example, the copy data length 315 may indicate a quantity of bytes 305 included the copy parameter list 300 excluding the bytes 305 utilized for the copy data length 315. That is, the copy data length 315 may indicate a quantity byte 305-*z*-bytes 305-*a* and 305-*b*—e.g., more generally n−1 where byte 305-*a* is zero (0) and byte 305-*z* is n. In some examples, copy data length 315 may be transmitted in two (2) bytes—e.g., bytes 305-*a* and 305-*b*).

Copy block descriptor data length 330 may be configured to indicate a quantity of information allocated to one or more block indicators. That is, the copy block descriptor data length 330 may indicate a quantity of information utilized to transmit copy block descriptors 345. For example, copy block descriptor data length 330 may indicate a quantity of bytes utilized to transmit copy block descriptor 345-*a* through 345-*n*. That is the copy block descriptor data length 330 may indicate a quantity of bytes 305-*z*-byte 305-*h*—e.g., more generally n−1 where byte 305-*a* is zero (0) and sixteen (15) bytes 305 are utilized to transmit the copy data length 315, copy block descriptor data length 330, reserved 335, and destination LBA 340. In some examples, copy block descriptor data length 330 may be transmitted in two (2) bytes—e.g., bytes 305-*c* and 305-*d*.

Reserved 335 (e.g., reserved 220 as described with reference to FIG. 2) may be configured to indicate bytes 305 (and their respective bits 310) are reserved for future use. In some examples, reserved 335 may be transmitted in four (4) bytes—e.g., bytes 305-*e* through bytes 305-*f*.

Destination LBA 340 may be configured to indicate a start address of a set of destination addresses the memory system may associate data to—e.g., the start address of a set of sequential destination addresses to which the data is to be copied. For example, the start address may be a lowest address included in the sequential set (e.g., the set of sequential destination addresses may include the destination LBA 340 and zero or more LBAs that are sequential thereto). The memory system may store data associated with one or more first addresses and associate the data with one or more second addresses in response to the copy command. The destination LBA 340 may be configured to indicate a start address for the one or more second addressees. In some examples, the memory system may associate the data with a set of sequential addresses that begin with the start address indicated in the destination LBA 340. In some examples, the destination LBA 340 may be transmitted in eight (8) bytes—e.g., bytes 305-*g* through 305-*h*.

Copy block descriptor 345 may be configured to be a block indicator. That is, the stored data associated with the one or more first addresses may also include one or more blocks of data. In the context of a block descriptor 345, a block may refer to a chunk of data of any size and thus, for example, may include any quantity of blocks 170. A copy parameter list 300 may include any quantity (e.g., one or more) of copy block descriptors 345. Additional details of individual copy block descriptors 345 are described with reference to FIG. 4. In some examples, each copy block descriptor 345 may be transmitted in sixteen (16) bytes— e.g., bytes 305-*i* through 305-*j* or bytes 305-*n* through 305-*z*.

Figure 4:
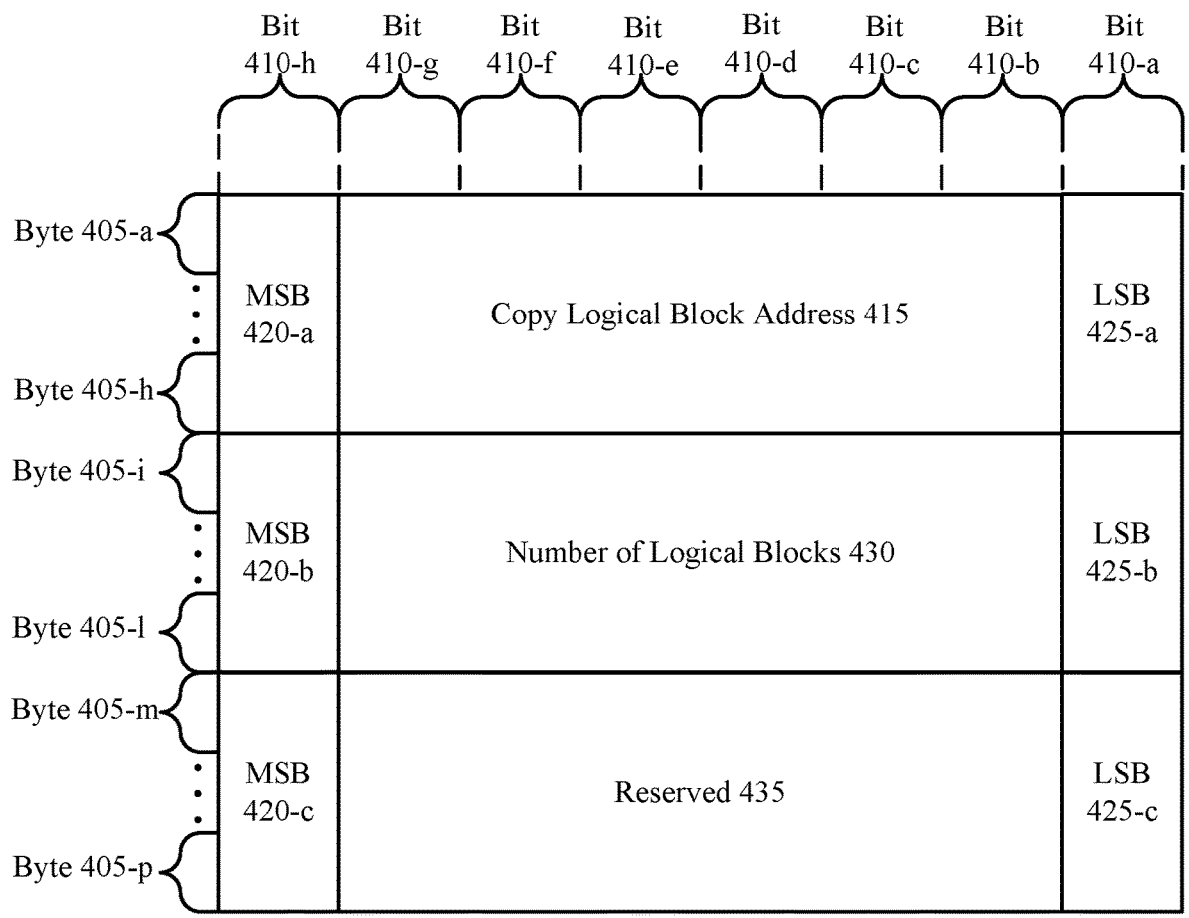
FIG. 4 illustrates an example of a copy block descriptor that supports a copy command for a memory system in accordance with examples as disclosed herein.

FIG. 4 illustrates an example of a copy block descriptor 400 that supports a copy command for a memory system in accordance with examples as disclosed herein. In some examples, the copy block descriptor 400 may be an example of copy block descriptor 345 as described with reference to FIG. 3. That is, in some examples, the copy block descriptor 400 may be included in a copy parameter list (e.g., copy parameter list 300) transmitted by a host system (e.g., host system 105 as described with reference to FIG. 1) to a memory system (e.g., memory system 110 as described with reference to FIG. 1). The memory system controller may receive the copy parameter list and the copy block descriptor 400 at a memory system controller (e.g., memory system controller 115 as described with reference to FIG. 1). The copy block descriptor 400 may include bytes 405—e.g., each copy block descriptor 400 may include sixteen bytes 405-a through 405-p. Each byte 405 may further include bits 410-a through 410-h. Each byte 405 may also have a MSB 420 and a LSB 425. For example, byte 405-a may include a MSB 320-a associated with bit 410-h and a LSB 425-a associated with bit 410-a. The copy block descriptor 400 may include a copy logical block address 415, number of logical blocks 430 and reserved 435.

Copy logical block address 415 may be configured to indicate a respective start address (e.g., logical address) for the block of data subject to the copy block descriptor 400. For example, a block of data may span (include data associated with) multiple LBAs and copy logical block address 415 may indicate a start address for the block of data. For example, where the block of data spans one or more LBAs, copy logical block address 415 may indicate a lowest or otherwise initial LBA included in those one or more LBAs. In some examples, the copy logical block address 415 may be transmitted in eight (8) bytes—e.g., bytes 405-a through 405-h.

Number of logical blocks 430 may be configured to indicate a size of the respective block of data subject to the copy block descriptor 400. That is, the number of logical blocks 430 may indicate a quantity of LBAs (or otherwise denote a quantity of data or quantity of units of data subject to the copy block descriptor 400). For example, the copy logical block address 415 may indicate a first LBA and the number of logical blocks 430 may indicate a total quantity of LBAs for the block of data subject to the copy block descriptor 400. For example, if the value of the number of logical blocks 430 is four (4), the memory system may associate a first LBA (as indicated by the copy logical block address 415), a second LBA sequential to the first LBA, a third LBA sequential to the second LBA, and a fourth LBA sequential to the third LBA with copy block descriptor 400—e.g., the memory system may copy the data from LBAs 1-4 to one or more corresponding second (e.g., destination) addresses based on the copy logical block address 415 indicating a start at LBA one (1) and the number of logical blocks 430 indicating four (4) blocks to associate or copy from. In some examples, number of logical blocks 430 may be transmitted in four (4) bytes e.g., bytes 405-i through 405-1.

Reserved 435 (e.g., reserved 220 as described with reference to FIG. 2) may be configured to indicate bytes 405-m through 405-p (and their respective bits 410) are reserved for future use. In some examples, reserved 435 may be transmitted in four (4) bytes—e.g., bytes 405-m through bytes 405-p.

Figure 5:
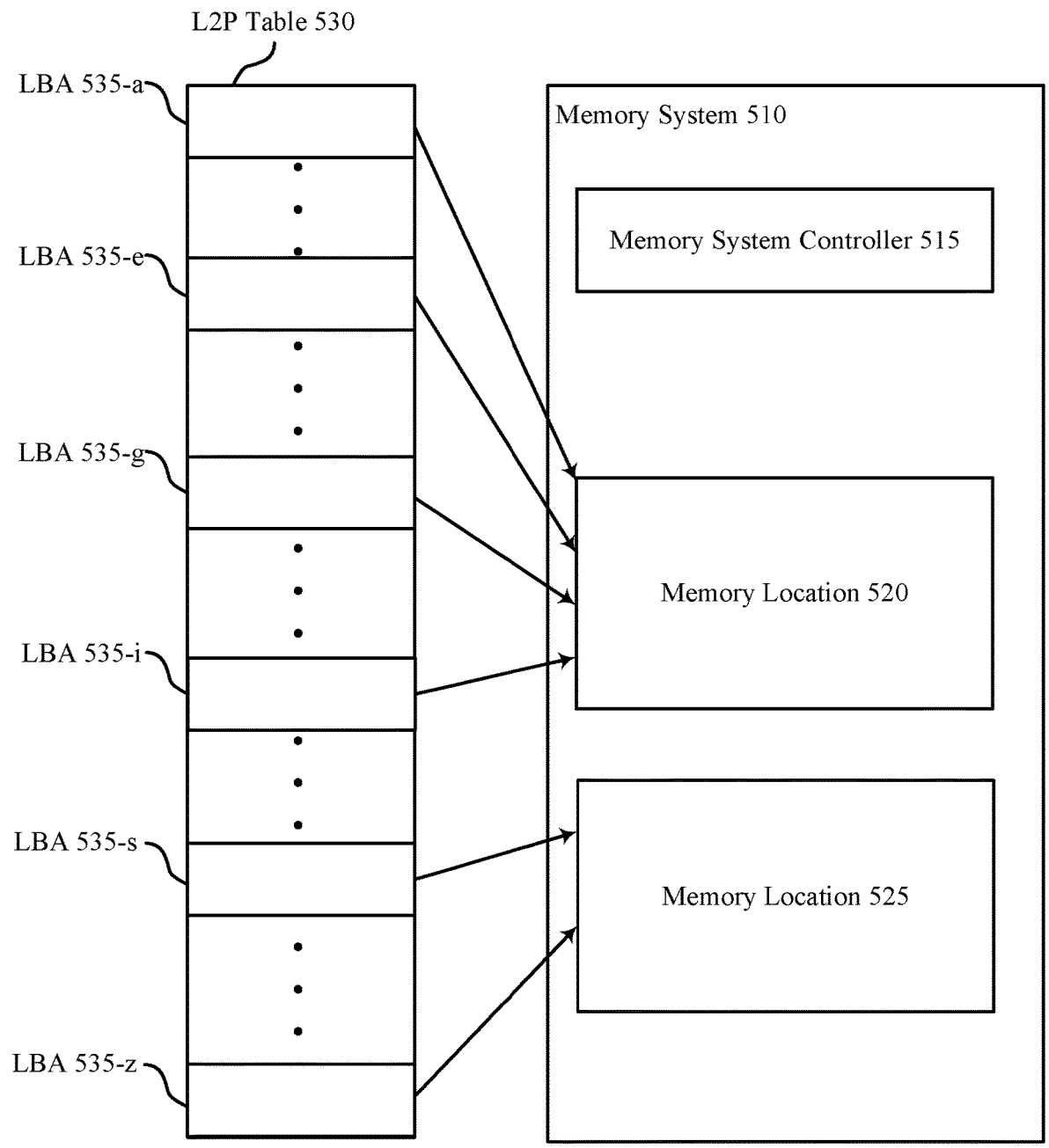
FIG. 5 illustrates an example of a system that supports a copy command for a memory system in accordance with examples as disclosed herein.

FIG. 5 illustrates an example of a system 500 that supports a copy command for a memory system in accordance with examples as disclosed herein. The system 500 may include a memory system 510 (e.g., a memory system 110 as described with reference to FIG. 1). The memory system 510 may include a memory system controller 515 (e.g., an mNAND controller or memory system controller 115 as described with reference to FIG. 1), and a memory location 520 (e.g., a source location) and a memory location 525 (e.g., destination location). In some examples, memory location 520 and memory location 525 may be in different memory devices (e.g., different memory devices 130 as described with reference to FIG. 1) or they may be in the same memory device (e.g., a same memory device 130). The system 500 further illustrates a mapping table—e.g., a logical to physical table (L2P table) 530. In some examples, the L2P table 530 may be stored at the memory system controller 515. In other examples, the L2P table 530 may be stored in one or more memory devices, and the memory system controller 515 may fetch the L2P table 530 relevant to an operation to be performed. The L2P table 530 may include entries associated with a respective logical block address (LBA) 535. In some examples, each LBA 535 may also be associated with (e.g., point to, indicate, map from an LBA to) a physical address in the memory system 510.

In some examples, a host system (e.g., host system 105 as described with reference to FIG. 1) may identify data associated with one or more first addresses (e.g., source addresses) within an address space of the memory system 510. In some cases, the host system may also transmit a copy command (e.g., copy command 200 as described with reference to FIG. 2) to the memory system 510 to indicate that the memory system 510 associate the data to one or more second addresses within the address space (e.g., destination addresses). For example, the host system may identify data associated with one or more LBAs 535 and transmit a copy command to the memory system 510 to indicate that the memory system is to associate the data with one or more second LBAs 535. The copy command may include fields and parameters as described with reference to FIG. 2. In some cases, the memory system 510 may receive the copy command at the memory system controller 515. Additionally, the memory system may transmit signaling responding to the copy command—e.g., the memory system 510 may transmit a response to the host system that indicates the memory system 510 is ready to perform the copy command. In some cases, the host system may transmit a copy parameter list (e.g., copy parameter list 300 as described with reference to FIG. 3) in response to receiving the signaling from the memory system. In some instances, the copy parameter list may include a length as indicated in the copy command—e.g., a quantity of bytes as indicated in the copy command.

The memory system 510 may receive the copy parameter list at the memory system controller 515. In some examples, the copy parameter list may indicate a start address of the one or more second addresses—e.g., a start destination LBA. For example, the copy parameter list may indicate to the memory system 510 a start LBA address at LBA 535-s. In some cases, the copy parameter list may also include one or more copy block descriptors (e.g., copy block descriptors 400 as described with reference to FIG. 4). For example, the copy block descriptors may each indicate a respective start address (e.g., copy logical block address 415 as described with reference to FIG. 4) and a size of the respective block (e.g., number of logical blocks 430 as described with reference to FIG. 4). That is, the copy block descriptors may indicate a first LBA 535 of the one or more first addresses to start the association from and a quantity of blocks to associate with the one or more second addresses.

For example, a first copy block descriptor may indicate to the memory system 510 a first start LBA 535-a. In some cases, the first copy block descriptor may also indicate to the memory system 510 to associate a quantity of five (5) LBAs. In such cases, the memory system controller 515 may start the copy command received from the host system by associating the LBA 535-a (e.g., the source LBA) with LBA 535-s (e.g., the destination LBA). For example, the memory system controller 515 may read data stored at a first set of memory cells in the memory location 520 (e.g., from the physical address associated with LBA 535-a in the L2P table) and write the data to a second set of memory cells in the memory location 525—e.g., to a second physical address. In such examples, the memory system controller 515 may update the L2P table 530 to associate the second physical address of the second set of memory cells to the LBA 535-*a*—e.g., associate the destination LBA 535-*s* with the second physical address of the data. Additionally, the memory system controller 515 may maintain the data stored at the first set of memory cells—e.g., the memory system controller 515 may refrain from erasing the data stored at the first set of memory cells. In such examples, the memory system 510 may have the data stored at the memory location 520 and a copy of the data stored at the memory location 525. In some cases, the memory system controller 515 may continue to read from the source block addresses and write data to the destination block addresses based on the quantity of blocks or addresses indicated in the number of logical blocks. For example, the memory system controller may then read data associated with a next sequential source block (e.g., LBA 535-*b*) and write the data to the next sequential destination block (e.g., LBA 535-*t*) and so forth until data associated with a fifth source block (e.g., LBA 535-*e*) is read and written to a fifth destination block (e.g., LBA 535-*w*)—e.g., based on the number of logical blocks indicating five (5) LBAs.

In some examples, the copy parameter list may also include a second copy block descriptor. In such example, the memory system controller 515 may determine a different start source LBA. For example, the memory system controller 515 may determine the copy parameter list includes a start LBA-g and a number of logical blocks associated with three (3) LBAs—e.g., the second copy block descriptor may include a set of three (3) source LBAs. In such examples, the memory system controller may read data stored at a third set of memory cells in the memory location 520 associated with the LBA 535-*i* and write the data to a fourth set of memory cells in the memory location 525 associated with LBA 535-*x*. That is, the memory system controller 515 may continue to write to the destination blocks sequentially—e.g., the first write operation associated with the second copy block descriptor may be at a destination block sequential to a second destination block written to during a last write operation associated with the first copy block descriptor. For example, if the memory system controller 515 writes to the LBA 535-*w* at the end of the first copy block descriptor, the memory system controller 515 may write to the next sequential LBA 535-*x* at the start of the second copy block descriptor. The memory system controller 515 may continue associating the source LBAs of the second copy block descriptor to the destination LBAs of the second copy block descriptor based on the number of logical blocks indicated (e.g., three). For example, the memory system controller 515 may finish performing the copy operation associated with the second block descriptor by reading data from a first physical location in memory location 520 associated with the LBA 535-*i* and writing the data to a second physical location in memory location 525 associated with the LBA 535-*z*. The memory system controller 515 may continue similar operations for any remaining copy block descriptor in the copy parameter list—e.g., for a third copy block descriptor, a fourth copy block descriptor, and so on.

In some examples, the memory system controller 515 may also indicate attributes of the memory system 510 associated with the copy command to the host system. For example, the memory system 510 attributes may be stored in a register at the memory system 510. The memory system controller 515 may transmit signaling indicating the values from the register to the host system, either in response to one or more related requests from the host system or as part of an initialization routine for the memory system, among other possibilities. In some cases, the memory system 510 may indicate the memory system 510 supports copy commands—for example, by indicating a value for a corresponding attribute (e.g., dExtendedUFSFeaturesSupport) that is indicative of such support. Additionally or alternatively, the memory system 510 indicate a maximum quantity of data the memory system supports copying in response to a single copy command—e.g., by indicating a value for a corresponding attribute (e.g., bMaximumCopyLbaCount). For example, the memory system 510 may indicate a total quantity of data (e.g., as expressed in terms of a corresponding total quantity of LBAs) the memory system may copy from across all copy block descriptors—e.g., the maximum sum of all copy block descriptor's number of logical blocks. Additionally or alternatively, the memory system 510 may indicate a maximum quantity of block indicators (e.g., a maximum quantity of copy block descriptors 345) the memory system supports for a single copy command—for example, by indicating a value of a corresponding attribute (e.g., bMaximumCopyBlockDescriptorCount). That is, the memory system 510 may indicate a maximum quantity of copy block descriptors the memory system 510 can process in a single copy command. Additionally or alternatively, the memory system 510 may indicate a maximum quantity of data the memory system 510 supports being associated with a single block indicator (e.g., a maximum value for a single number of logical blocks 430)—for example, by indicating a value of a corresponding attribute (e.g., bMaximumCopyBlockDescriptorSize). That is, the memory system 510 may indicate a maximum size for a single number of logical blocks in a copy block descriptor.

In some cases, the memory system 510 may also be allowed, for at least some commands, to transmit a busy status to the host system related to executing a command for only a limited duration, which may be referred to as a BUSY TIMEOUT PERIOD. In some examples, a copy command as described herein may be subject to the BUSY TIMEOUT PERIOD, in which case the memory system 510 may only return busy status for a given copy command for a duration corresponding to the duration of the BUSY TIMEOUT PERIOD. In such examples, the memory system 510 may terminate the copy command if a duration to execute the copy command exceeds the busy timeout period value (e.g., duration).

Figure 6:
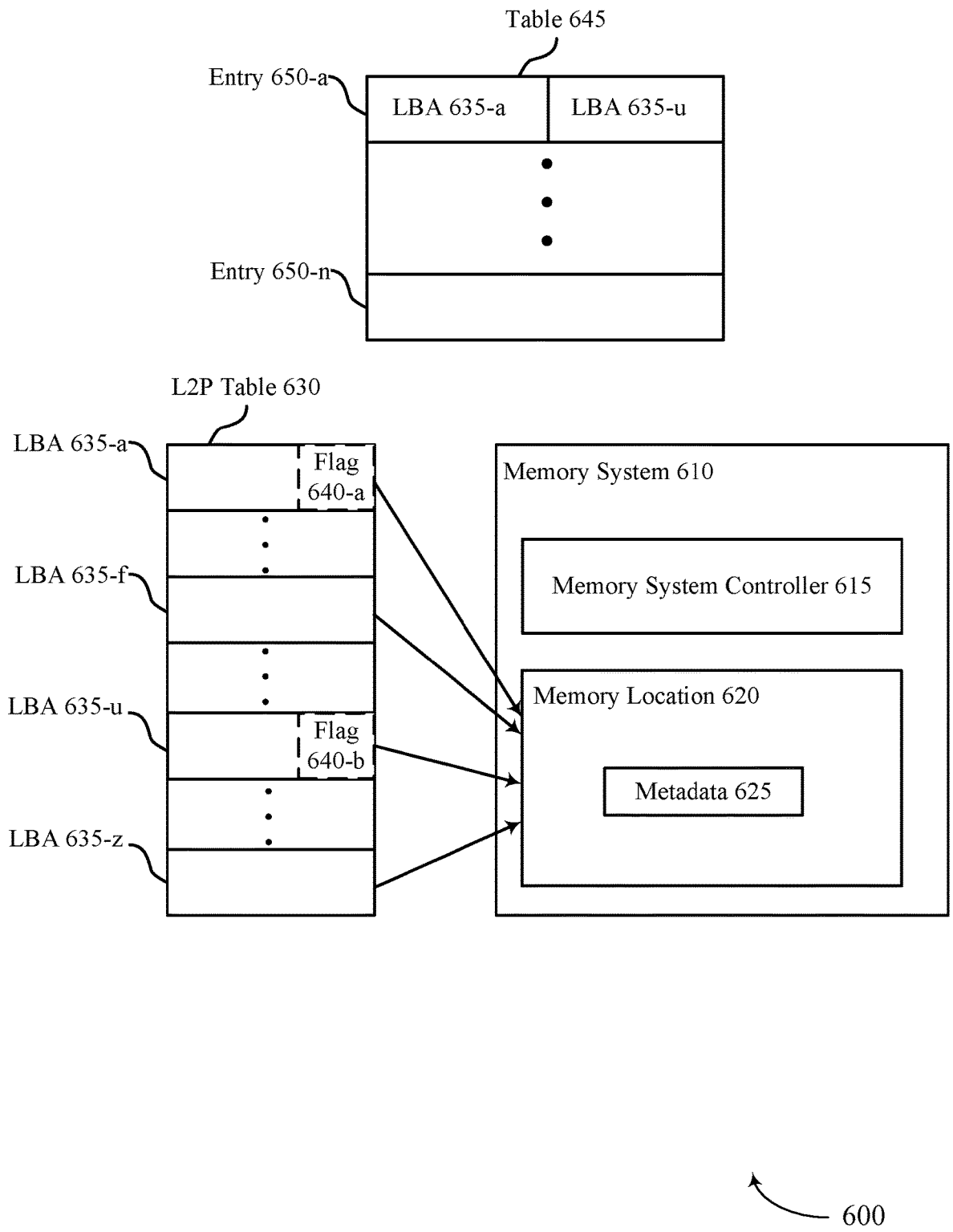
FIG. 6 illustrates an example of a system that supports a copy command for a memory system in accordance with examples as disclosed herein.

FIG. 6 illustrates an example of a system 600 that supports a copy command for a memory system in accordance with examples as disclosed herein. In some examples, system 600 may be an example of system 100 as described with reference to FIG. 1 or system 500 as described with reference to FIG. 5. The system 600 may include a memory system 610 (e.g., a memory system 110 as described with reference to FIG. 1). The memory system 610 may include a memory system controller 615 (e.g., an mNAND controller or memory system controller 115 as described with reference to FIG. 1), and a memory location 620. In some examples, memory location 620 may be in a memory device (e.g., memory device 130 as described with reference to FIG. 1). The system 600 further illustrates a mapping table—e.g., a logical to physical table (L2P table) 630. In some examples, the L2P table 630 may be stored at the memory system controller 615. In other examples, the L2P table 630 may be stored in one or more memory devices, and memory system controller 615 may fetch the L2P table 530 relevant to an operation to be performed. The L2P table 630 may include entries associated with a respective logical block address (LBA) 635. In some examples, each LBA 365 may also be associated with (e.g., point to, indicate, map from an LBA to) a physical address in the memory system 610. The system 600 also illustrates a table 645. The table 645 may also be stored at the memory system controller 615. The table 645 may include entries 650.

As described with reference to FIG. 5, a host system (e.g., host system 105 as described with reference to FIG. 1) may transmit a copy command (e.g., copy command 200 as described with reference to FIG. 2) to a memory system 610 after identifying data associated with one or more first addresses (e.g., source LBAs) within an address space associated with the memory system 610. The host system may transmit the copy command to the memory system 610 to indicate that the memory system 610 is to associate the data to one or more second addresses within the address space (e.g., destination LBAs). The memory system 610 may transmit signaling responding to the copy command and receive a copy parameter list (e.g., copy parameter list 300 as described with reference to FIG. 3) from the host system in response to transmitting the signaling. The copy parameter list transmitted by the host system may include the one or more second addresses (e.g., destination LBA 340 as described with reference to FIG. 3) and one or more block indicators (e.g., copy block descriptors 345 as described with reference to FIG. 3). The memory system controller 615 may determine a start address (e.g., copy logical block address 415 as described with reference to FIG. 4) and a size of a respective block (e.g., number of logical blocks 430 as described with reference to FIG. 4) in each respective block indicator.

For example, the memory system 610 may receive a copy command with a copy block descriptor indicating a start address LBA 635-*a* for the one or more first addresses and a number of logical blocks having a value of six (6) blocks. In some examples, the memory system 610 may also receive a destination LBA for the one or more second addresses having an address LBA 635-*u* to associate the data with. In some cases, the memory system controller 615 may update the L2P table 630 by associating the LBA 635-*u* with a physical address associated with LBA 635-*a*. That is, the memory system controller 615 may execute the copy command and the operations associated with the copy block descriptor by mapping the LBA 635-*u* with the same physical location associated with LBA 635-*a* without actually transferring the data from a first physical location to a second physical location—e.g., LBA 635-*a* and LBA 635-*u* may be associated with a same set of memory cells that was already physically storing the data before the copy command was issued. In such examples, the memory system controller 615 may also maintain the association between the source LBA and the physical address of the data. For example, the memory system controller 615 may maintain the association of LBA 635-*a* with the physical address of the set of memory cells.

In some examples, the memory system controller 615 may indicate an LBA 635 associated with the data stored in memory location 620. For example, the memory system controller may indicate in metadata 625 that LBA 635-*a* is associated with the data in memory location 620. In some instances, the memory system controller 615 may indicate the associated LBA 635 to reduce errors. Accordingly, in addition to updating the L2P table 630, the memory system controller 615 may also maintain a table 645 that associates the one or more first addresses with the one or more second addresses. That is, the memory system controller 615 may maintain the table 645 to associate a source LBA with a destination LBA that share a same physical address. For example, the memory system controller 615 may update an entry 650-*a* that indicates LBA 635-*a* is associated with LBA 635-*u*—e.g., that LBA 635-*a* shares the same physical address as LBA 635-*u*. In some examples, the memory system controller 615 may write a flag 640-*a* (e.g., a bit or a field), a flag 640-*b*, or both to indicate the respective LBA 635-*a* or LBA 635-*u* is associated with a shared physical address and to check the table 645 accordingly. In other examples, the memory system controller may store a flag in metadata 625 to indicate the physical address is shared by multiple LBAs 635-*a* and 635-*u* and to check the table 645 accordingly, where the metadata 625 may be associated with the data stored in memory location 620.

For example, the host system may transmit an access command associated with at least a portion of the data stored at memory location 620 to the memory system 610—e.g., an access command associated with data stored at the physical address that is associated with both LBA 635-*a* and LBA 635-*u*. In some examples, the memory system controller may read the L2P table 630 in response to receiving the access command. In examples where the memory system controller 615 stores a flag in the LBA 635-*a* (e.g., stores the flag 640-*a*) or the flag in LBA 635-*u* (e.g., stores the flag 640-*b*), the memory system controller 615 may preemptively check the table 645 and the entry 650-*a*. That is, whether the access command is associated with the LBA 635-*a* or the LBA 635-*u*, the memory system controller 615 may check the table 645 to determine if a correct LBA 635 is associated with the physical address in memory location 620 based on the flag 640. For example, if the memory system controller 615 receives an access command associated with LBA 635-*u*, the memory system controller 615 may check entry 650-*a* in the table 645 based on the flag 640-*b* (e.g., the flag). In such examples, the memory system controller 615 may determine the physical address of memory location 620 is associated with both LBA 635-*u* and 635-*a*. Thus, the memory system controller 615 may continue the access operation if metadata 625 stores either the association to LBA 635-*a* or LBA 635-*u*.

In other examples, where the memory system controller 615 stores a flag in the metadata 625, the memory system controller 615 may first read the LBA 635 associated with the access command (e.g., either LBA 635-*a* or LBA 635-*u*), determine the physical address at memory location 620, and then read the metadata 625. The memory system controller 615 may then check the table 645 based on the flag stored at the metadata 625 and proceed with the access operation if either LBA 635-*a* or LBA 635-*u* is indicated in the metadata 625.

In some examples, the memory system controller 615 may perform similar updates in the L2P table 630 for the remaining one or more first addresses and one or more second addresses. For example, the memory system controller may associate LBA 635-*v* with a second physical location that is associated LBA 635-*b* and so forth until the number of logical blocks quantity is satisfied—e.g., until a sixth destination LBA 635-*z* is associated with a same physical address as a sixth source block LBA 635-*f*. The memory system controller 615 may perform a similar process for any quantity of copy block descriptors included in the copy command.

In some instances, the memory system controller 615 may receive an unmap command after executing the copy command received form the host system. For example, the unmap command may be associated with unmapping either LBA 635-*a* or LBA 635-*u*. In some examples, if the memory system controller 615 receives an unmapping command for 635-*a*, the memory system controller 615 may unmap LBA 635-*a* from the physical address associated with memory location 620 but keep the entry 650-*a* in the table 645. That is, the memory system controller may unmap the LBA 635-*a* from the physical address but keep the association between LBA 635-*u* and the physical address—e.g., the memory system controller may erase entry LBA 635-*a* but refrain from erasing the data stored in the memory location 620. Because metadata 625 may indicate an association between the physical address at memory location 620 with the LBA 635-*a*, the memory system controller 615 may retain entry 650-*a* and either the flag 640-*b* or the flag in metadata 625. Thus, the memory system controller 615 may utilize the flag 640-*b* in the entry LBA 635-*u* or the metadata 625 to check table 645 in response to a subsequent access command for at least a portion of the data stored at the memory location 620. For example, the memory system controller 615 may check the entry 650-*a* and proceed with the access operation associated with LBA 635-*u* if metadata 625 indicates an association with LBA 635-*a* as indicated in entry 650-*a*. In other examples, if the memory system controller receives an unmapping command for 635-*u*, the memory system controller may unmap LBA 635-*u* from the physical address associated with memory location 620 and also delete the entry 650-*a* in the table 645. That is, the metadata 625 may indicate the association of memory location 620 to LBA 635-*a* and checking the entry 650-*a* would be redundant.

It should be noted, that as described with reference to FIG. 5, the memory system 610 may also indicate attributes of the memory system 610 associated with the copy command to the host system. For example, the memory system 610 may indicate the values of one or more attributes (e.g., dExtendedUFSFeaturesSupport, bMaximumCopyLbaCount, bMaximumCopyBlockDescriptorCount, or bMaximumCopyBlockDescriptorSize) as described herein, and the copy command may be subject to the BUSY TIMEOUT PERIOD to the host system as described with reference to FIG. 5.

Figure 7:
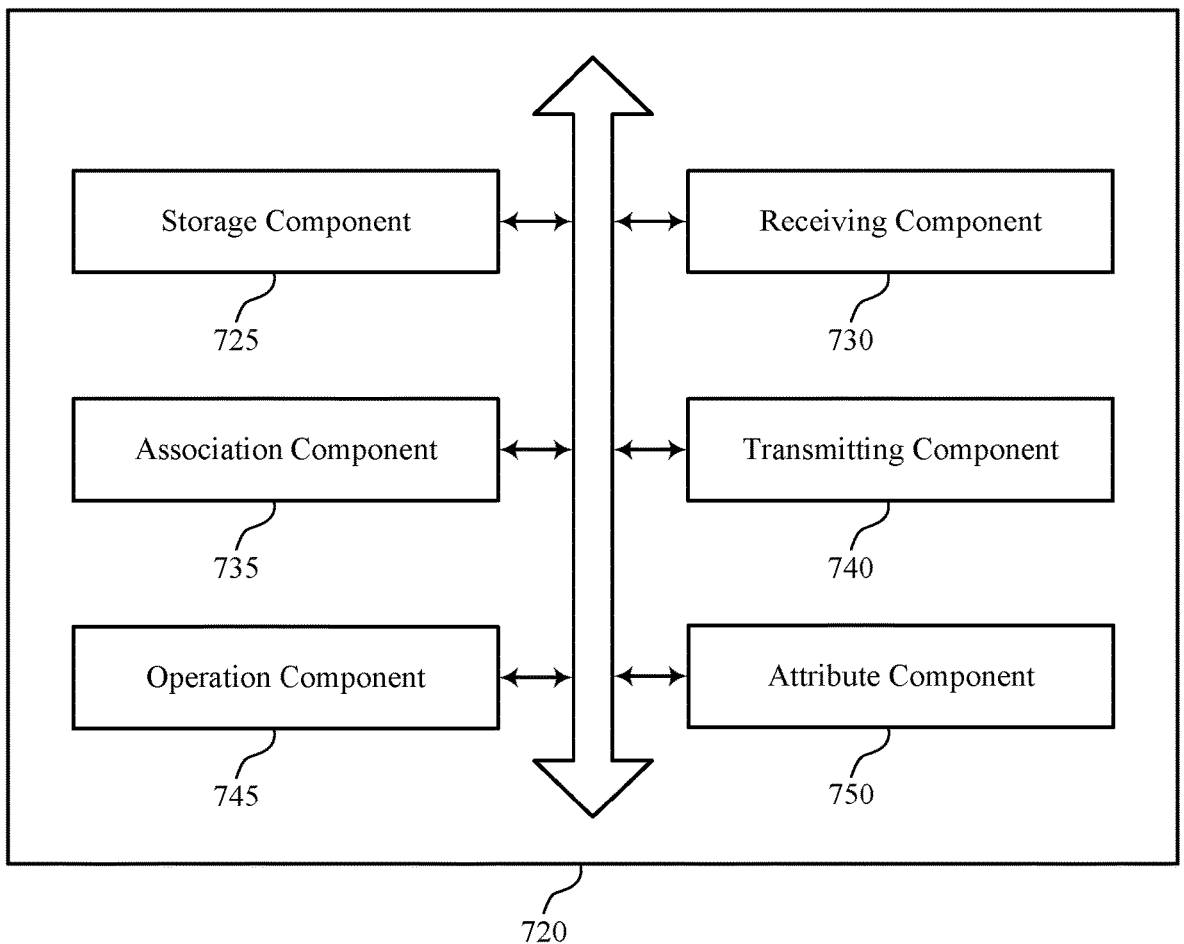
FIG. 7 shows a block diagram of a memory system that supports a copy command for a memory system in accordance with examples as disclosed herein.

FIG. 7 shows a block diagram 700 of a memory system 720 that supports a copy command for a memory system in accordance with examples as disclosed herein. The memory system 720 may be an example of aspects of a memory system as described with reference to FIGS. 1 through 6. The memory system 720, or various components thereof, may be an example of means for performing various aspects of a copy command for a memory system as described herein. For example, the memory system 720 may include a storage component 725, a receiving component 730, an association component 735, a transmitting component 740, an operation component 745, or any combination thereof. Each of these components may communicate, directly or indirectly, with one another (e.g., via one or more buses).

The storage component 725 may be configured as or otherwise support a means for storing, within the memory system, data associated with one or more first addresses within an address space. In some cases, the storage component 725 may be configured as or otherwise support a means for continuing to store the data at the set of memory cells having the one or more physical addresses, where the one or more first addresses comprise one or more first logical addresses and the one or more mapping tables, after the data is associated with the one or more second addresses, associate the one or more physical addresses with both the one or more second logical addresses and the one or more first logical addresses. In some instances, the data stored by storage component 725 includes one or more blocks of data.

In some examples, the memory system and storage component 725 includes a universal flash storage (UFS) device. In some examples, the one or more second addresses at the storage component 725 include one or more second logical addresses. In some cases, the data at storage component 725 remains stored at the first set of memory cells after the copy of the data is written to the second set of memory cells. In some instances, the one or more second addresses of the storage component 725 include one or more second logical addresses. In some cases, the data at storage component 725, prior to receiving the copy command, is stored at a set of memory cells having one or more physical addresses.

The receiving component 730 may be configured as or otherwise support a means for receiving a copy command for the data from a host for the memory system. In some examples, the receiving component 730 may be configured as or otherwise support a means for receiving, from the host, a list of copy parameters associated with the copy command, where the list of copy parameters indicates the one or more first addresses, the one or more second addresses, or both. In some cases, the receiving component 730 may be configured as or otherwise support a means for receiving an access command for at least a portion of the data. In some instances, the copy command received by the receiving component 730 includes an indication of a length of the list of copy parameters. In some examples, the list of copy parameters received by receiving component 730 includes one or more block indicators each for a respective block of the one or more blocks.

In some instances, a block indicator of the one or more block indicators received by receiving component 730 includes an indication of a respective start address within the address space for the respective block, an indication of a size of the respective block, or both. In some cases, the list of copy parameters received by receiving component 730 includes an indication of a quantity of information allocated to the one or more block indicators. In some instances, the list of copy parameters received by receiving component 730 includes an indication of a quantity of information included in the list of copy parameters, the quantity of information exclusive of the indication of the quantity. In some examples, the list of copy parameters received by receiving component 730 includes an indication of a start address within the one or more second addresses. In some cases, the copy command received by receiving component 730 includes an operation code that is specific to copy commands.

The association component 735 may be configured as or otherwise support a means for associating, in response to the copy command, the data with one or more second addresses within the address space. In some examples, to support associating the data with the one or more second addresses, the association component 735 may be configured as or otherwise support a means for associating the data with a set of sequential addresses that begins with the start address indicated by the list of copy parameters. In some instances, the association component 735 may be configured as or otherwise support a means for the one or more first addresses include one or more first logical addresses. In some cases, the association component 735 may be configured as or otherwise support a means for the one or more mapping tables, after the data is associated with the one or more second addresses, associate the one or more physical addresses with both the one or more second logical addresses and the one or more first logical addresses.

In some instances, the association component 735 may be configured as or otherwise support a means for maintaining one or more second tables that associate the one or more first logical addresses with the one or more second logical addresses. In some cases, the association component 735 may be configured as or otherwise support a means for checking the one or more second tables based at least in part on receiving the access command, where the checking is based at least in part on a flag stored within the one or more mapping tables in association with a first logical address of the one or more first logical addresses or in association with a second logical address of the one or more second logical addresses, or where the checking is based at least in part on metadata stored in association with the at least the portion of the data. In some cases, associating the data with the one or more second addresses by the association component 735 includes updating one or more mapping tables within the memory system to associate the one or more second logical addresses with the one or more physical addresses. In some instances, associating the data with the one or more second addresses by the association component 735 includes updating one or more mapping tables within the memory system to associate the one or more second logical addresses with one or more second physical addresses corresponding to the second set of memory cells.

In some cases, the transmitting component 740 may be configured as or otherwise support a means for transmitting, from the memory system to the host, signaling responsive to the copy command, where receiving the list of copy parameters is based at least in part on transmitting the signaling responsive to the copy command. In some instances, the transmitting component 740 may be configured as or otherwise support a means for indicating, by the memory system to the host, support by the memory system for copy commands, a maximum quantity of data that the memory system supports copying in response to a single copy command, a maximum quantity of block indicators that the memory system supports for a single copy command where the data includes one or more blocks of data each associated with a respective block indicator, a maximum quantity of data that the memory system supports being associated with a single block indicator, or any combination thereof.

In some cases, the operation component 745 may be configured as or otherwise support a means for reading, in response to the copy command, the data from a first set of memory cells associated with the one or more first addresses. In some examples, the operation component 745 may be configured as or otherwise support a means for writing, in response to the copy command, a copy of the data to a second set of memory cells associated with the one or more second addresses. In some instances, operation component 745 is allowed for a limited duration to transmit a busy status to the host in response to receiving the copy command.

Figure 8:
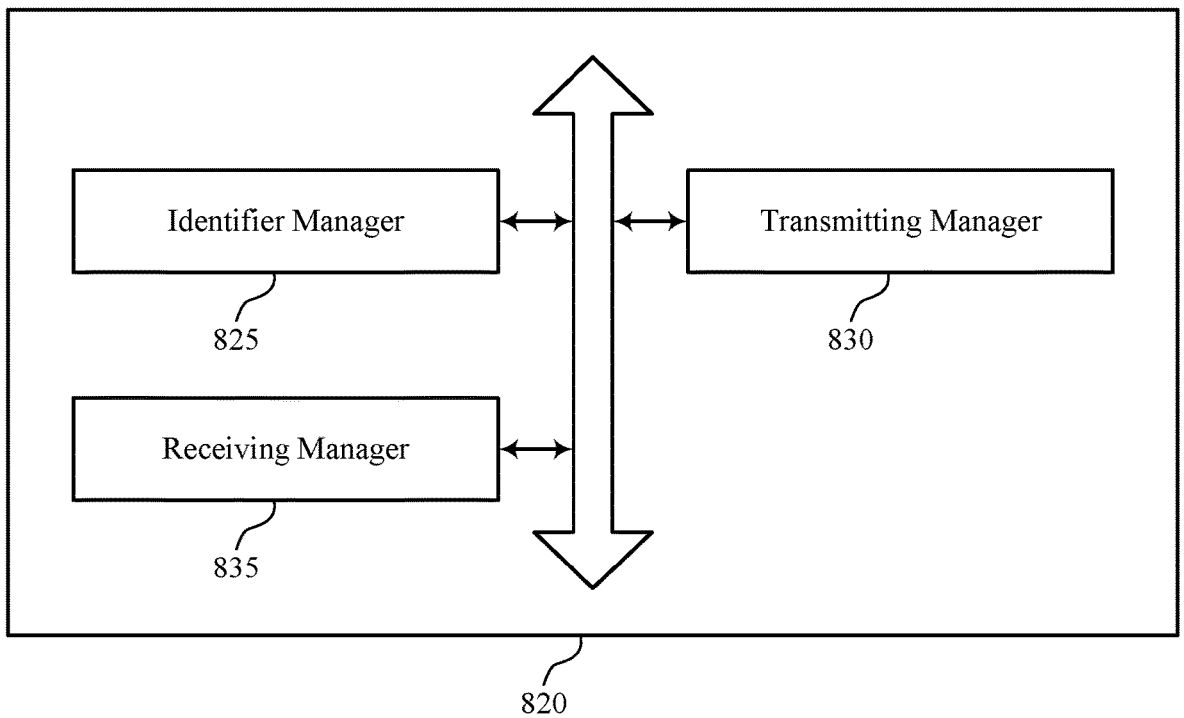
FIG. 8 shows a block diagram of a host system that supports a copy command for a memory system in accordance with examples as disclosed herein.

FIG. 8 shows a block diagram 800 of a host system 820 that supports a copy command for a memory system in accordance with examples as disclosed herein. The host system 820 may be an example of aspects of a host system as described with reference to FIGS. 1 through 6. The host system 820, or various components thereof, may be an example of means for performing various aspects of a copy command for a memory system as described herein. For example, the host system 820 may include an identifier manager 825, a transmitting manager 830, a receiving manager 835, or any combination thereof. Each of these components may communicate, directly or indirectly, with one another (e.g., via one or more buses).

The identifier manager 825 may be configured as or otherwise support a means for identifying data associated with one or more first addresses within an address space associated with the memory system. In some examples, the data identified by identifier manager 825 includes one or more blocks of data. In some examples, the list of copy parameters includes one or more block indicators each for a respective block of the one or more blocks. In some instances, the one or more second addresses identified by the identifier manager 825 includes a set of sequential addresses that begins with the start address indicated by the list of copy parameters. In some cases, the one or more first addresses identified by identifier manager 825 include one or more first logical block addresses (LBAs). In some examples, the one or more second addresses include one or more second LBAs.

The transmitting manager 830 may be configured as or otherwise support a means for transmitting a copy command to the memory system, where the copy command indicates that the memory system is to associate the data with one or more second addresses within the address space. In some instances, the transmitting manager 830 may be configured as or otherwise support a means for transmitting, after transmitting the copy command, an access command for at least a portion of the data to the memory system, where the access command is associated with a second address of the one or more second addresses. In some cases, the transmitting manager 830 may be configured as or otherwise support a means for transmitting, to the memory system, a list of copy parameters associated with the copy command, where the list of copy parameters indicates the one or more first addresses, the one or more second addresses, or both. In some instances, the copy command transmitted by transmitting manger 830 further indicates that the data is to remain associated with the one or more first addresses after the data is associated with the one or more second addresses. In some cases, the copy command transmitted by transmitting manger 830 includes an operation code that is specific to copy commands. In some instances, the copy command transmitted by transmitting manger 830 includes an indication of a length of the list of copy parameters. In some cases, a block indicator of the one or more block indicators transmitted by transmitting manger 830 includes an indication of a respective start address within the address space for the respective block, an indication of a size of the respective block, or both. In some examples, the list of copy parameters transmitted by transmitting manger 830 includes an indication of a quantity of information allocated to the one or more block indicators. In some instances, the list of copy parameters transmitted by transmitting manger 830 includes an indication of a quantity of information included in the list of copy parameters, the quantity of information exclusive of the indication of the quantity. In some cases, the list of copy parameters transmitted by transmitting manger 830 includes an indication of a start address within the one or more second addresses.

In some examples, the receiving manager 835 may be configured as or otherwise support a means for receiving, from the memory system, signaling responsive to the copy command, where transmitting the list of copy parameters is based at least in part on receiving the signaling responsive to the copy command. In some instances, the receiving manager 835 may be configured as or otherwise support a means for receiving, from the memory system, signaling that indicates support by the memory system for copy commands, a maximum quantity of data that the memory system supports copying in response to a single copy command, a maximum quantity of block indicators that the memory system supports for a single copy command where the data includes one or more blocks of data each associated with a respective block indicator, a maximum quantity of data that the memory system supports being associated with a single block indicator, or any combination thereof. In some cases, the receiving manger 835 receives a busy status, where the busy status is allowed to be transmitted by a memory system for a limited duration to the host system in response to receiving the copy command.

Figure 9:
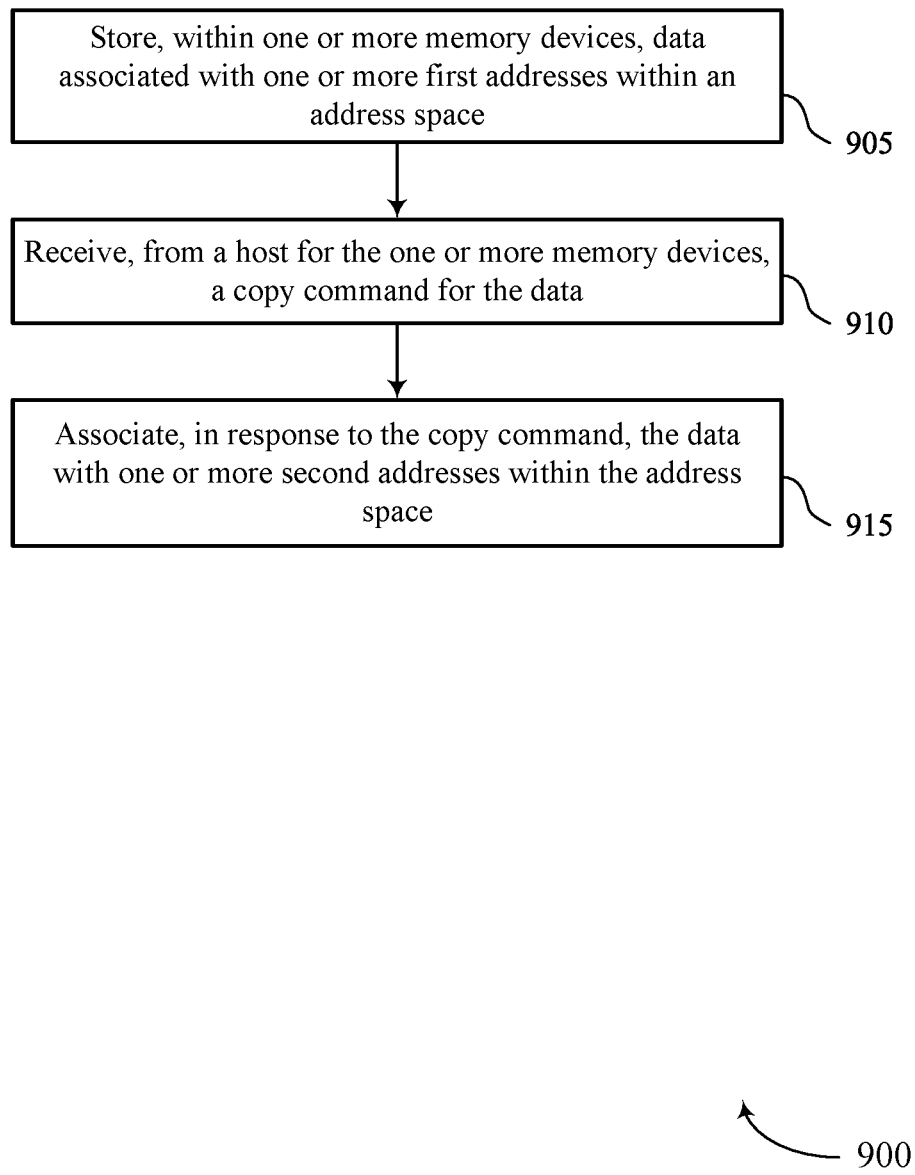
FIGS. 9 and 10 show flowcharts illustrating a method or methods that support copy command for a memory system in accordance with examples as disclosed herein.

FIG. 9 shows a flowchart illustrating a method 900 that supports a copy command for a memory system in accordance with examples as disclosed herein. The operations of method 900 may be implemented by a memory system (e.g., one or more memory devices) or its components as described herein. For example, the operations of method 900 may be performed by a memory system as described with reference to FIGS. 1 through 7. In some examples, a memory system may execute a set of instructions to control the functional elements of the device to perform the described functions. Additionally or alternatively, the memory system may perform aspects of the described functions using special-purpose hardware.

At 905, the method may include storing, within the one or more memory devices, data associated with one or more first addresses within an address space. The operations of 905 may be performed in accordance with examples as disclosed herein. In some examples, aspects of the operations of 905 may be performed by a storage component 725 as described with reference to FIG. 7.

At 910, the method may include receiving, from a host for the one or more memory devices, a copy command for the data. The operations of 910 may be performed in accordance with examples as disclosed herein. In some examples, aspects of the operations of 910 may be performed by a receiving component 730 as described with reference to FIG. 7.

At 915, the method may include associating, in response to the copy command, the data with one or more second addresses within the address space. The operations of 915 may be performed in accordance with examples as disclosed herein. In some examples, aspects of the operations of 915 may be performed by an association component 735 as described with reference to FIG. 7.

In some cases, an apparatus as described herein may perform a method or methods, such as the method 900. The apparatus may include, features, circuitry, logic, means, or instructions (e.g., a non-transitory computer-readable medium storing instructions executable by a processor) for storing, within one or more memory devices, data associated with one or more first addresses within an address space, receiving, from a host for the one or more memory devices, a copy command for the data, and associating, in response to the copy command, the data with one or more second addresses within the address space.

Some instances of the method 900 and the apparatus described herein may further include operations, features, circuitry, logic, means, or instructions for receiving, from the host, a list of copy parameters associated with the copy command, where the list of copy parameters indicates the one or more first addresses, the one or more second addresses, or both.

In some examples of the method 900 and the apparatus described herein, the copy command includes an indication of a length of the list of copy parameters.

In some cases of the method 900 and the apparatus described herein, the data includes one or more blocks of data and the list of copy parameters includes one or more block indicators each for a respective block of the one or more blocks.

In some instances of the method 900 and the apparatus described herein, a block indicator of the one or more block indicators includes an indication of a respective start address within the address space for the respective block, an indication of a size of the respective block, or both.

In some cases of the method 900 and the apparatus described herein, the list of copy parameters includes an indication of a quantity of information allocated to the one or more block indicators.

In some instances of the method 900 and the apparatus described herein, the list of copy parameters includes an indication of a quantity of information included in the list of copy parameters, the quantity of information exclusive of the indication of the quantity.

In some cases of the method 900 and the apparatus described herein, the list of copy parameters includes an indication of a start address within the one or more second addresses.

In some instances of the method 900 and the apparatus described herein, associating the data with the one or more second addresses may include operations, features, circuitry, logic, means, or instructions for associating the data with a set of sequential addresses that begins with the start address indicated by the list of copy parameters.

Some cases of the method 900 and the apparatus described herein may further include operations, features, circuitry, logic, means, or instructions for transmitting, from the memory system to the host, signaling responsive to the copy command, where receiving the list of copy parameters may be based at least in part on transmitting the signaling responsive to the copy command.

Some instances of the method 900 and the apparatus described herein may further include operations, features, circuitry, logic, means, or instructions for indicating, by the memory system to the host, support by the one or more memory devices for copy commands, a maximum quantity of data that the one or more memory devices support copying in response to a single copy command, a maximum quantity of block indicators that the one or more memory devices support for a single copy command where the data includes one or more blocks of data each associated with a respective block indicator, a maximum quantity of data that the one or more memory devices supports being associated with a single block indicator, or any combination thereof.

In some cases of the method 900 and the apparatus described herein, the copy command includes an operation code that may be specific to copy commands.

In some instances of the method 900 and the apparatus described herein, the memory system may be allowed for a limited duration to transmit a busy status to the host based at least in part on receiving the copy command (e.g., in response to the copy command, based on executing one or more operations in response to the copy command).

In some cases of the method 900 and the apparatus described herein, the memory system may be a universal flash storage (UFS) device.

Some instances of the method 900 and the apparatus described herein may further include operations, features, circuitry, logic, means, or instructions for reading, in response to the copy command, the data from a first set of memory cells associated with the one or more first addresses and writing, in response to the copy command, a copy of the data to a second set of memory cells associated with the one or more second addresses, where the associating is based at least in part on the writing.

In some cases of the method 900 and the apparatus described herein, the one or more second addresses include one or more second logical addresses and associating the data with the one or more second addresses includes updating one or more mapping tables within the memory system to associate the one or more second logical addresses with one or more second physical addresses corresponding to the second set of memory cells.

In some instances of the method 900 and the apparatus described herein, the data remains stored at the first set of memory cells after the copy of the data may be written to the second set of memory cells.

In some cases of the method 900 and the apparatus described herein, the one or more second addresses include one or more second logical addresses, and the data, prior to receiving the copy command, may be stored at a set of memory cells having one or more physical addresses, and associating the data with the one or more second addresses includes updating one or more mapping tables within the memory system to associate the one or more second logical addresses with the one or more physical addresses.

Some instances of the method 900 and the apparatus described herein may further include operations, features, circuitry, logic, means, or instructions for continuing to store the data at the set of memory cells having the one or more physical addresses, where the one or more first addresses include one or more first logical addresses and the one or more mapping tables, after the data may be associated with the one or more second addresses, associate the one or more physical addresses with both the one or more second logical addresses and the one or more first logical addresses.

Some instances of the method 900 and the apparatus described herein may further include operations, features, circuitry, logic, means, or instructions for maintaining one or more second tables that associate the one or more first logical addresses with the one or more second logical addresses.

Some cases of the method 900 and the apparatus described herein may further include operations, features, circuitry, logic, means, or instructions for receiving an access command for at least a portion of the data and checking the one or more second tables based at least in part on receiving the access command, where the checking may be based at least in part on a flag stored within the one or more mapping tables in association with a first logical address of the one or more first logical addresses or in association with a second logical address of the one or more second logical addresses, or where the checking may be based at least in part on metadata stored in association with the at least the portion of the data.

Figure 10:
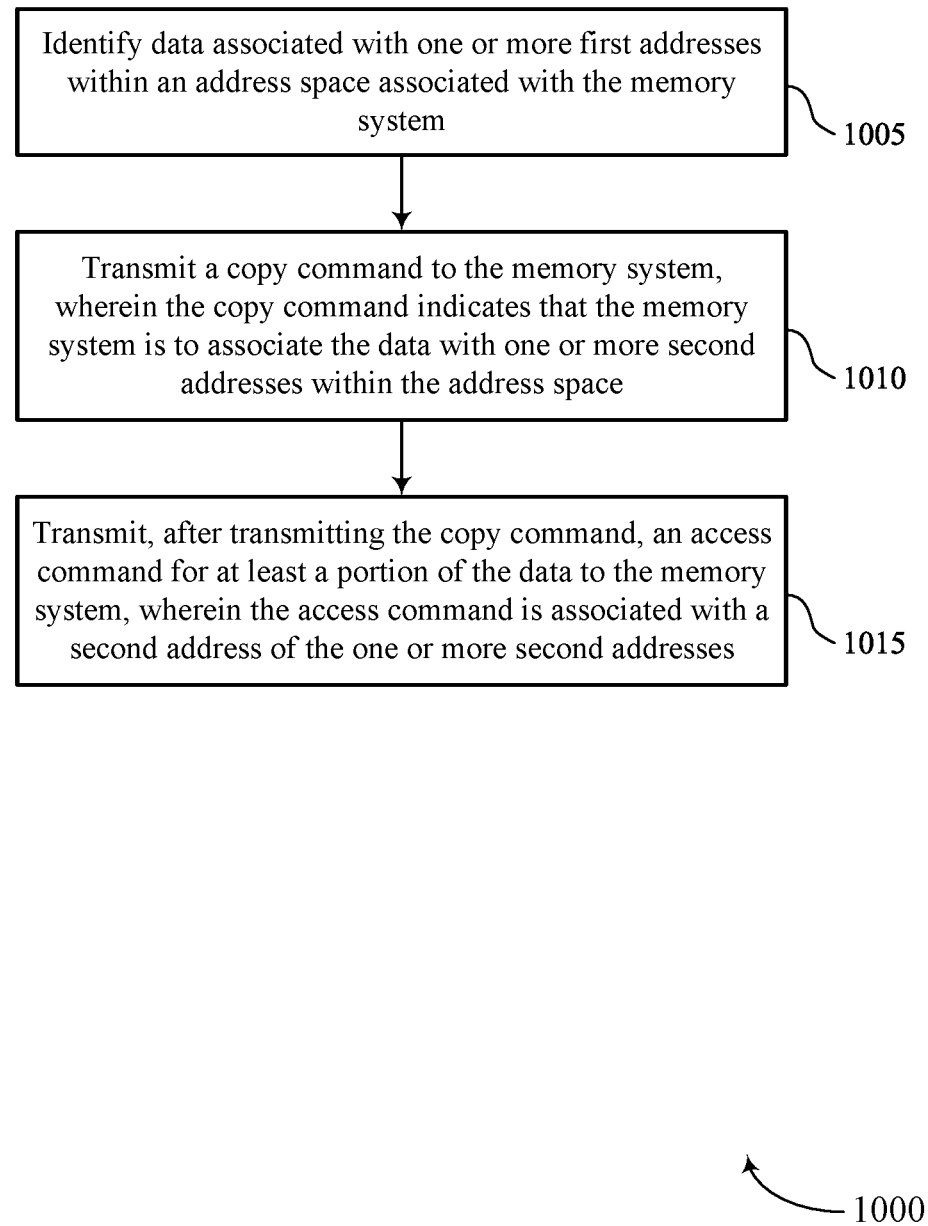

FIG. 10 shows a flowchart illustrating a method 1000 that supports a copy command for a memory system in accordance with examples as disclosed herein. The operations of method 1000 may be implemented by a host system or its components as described herein. For example, the operations of method 1000 may be performed by a host system as described with reference to FIGS. 1 through 6 and 8. In some examples, a host system may execute a set of instructions to control the functional elements of the device to perform the described functions. Additionally or alternatively, the host system may perform aspects of the described functions using special-purpose hardware.

At 1005, the method may include identifying data associated with one or more first addresses within an address space associated with the memory system. The operations of 1005 may be performed in accordance with examples as disclosed herein. In some examples, aspects of the operations of 1005 may be performed by an identifier manager 825 as described with reference to FIG. 8.

At 1010, the method may include transmitting a copy command to the memory system, where the copy command indicates that the memory system is to associate the data with one or more second addresses within the address space. The operations of 1010 may be performed in accordance with examples as disclosed herein. In some examples, aspects of the operations of 1010 may be performed by a transmitting manager 830 as described with reference to FIG. 8.

At 1015, the method may include transmitting, after transmitting the copy command, an access command for at least a portion of the data to the memory system, where the access command is associated with a second address of the one or more second addresses. The operations of 1015 may be performed in accordance with examples as disclosed herein. In some examples, aspects of the operations of 1015 may be performed by a transmitting manager 830 as described with reference to FIG. 8.

In some instances, an apparatus as described herein may perform a method or methods, such as the method 1000. The apparatus may include, features, circuitry, logic, means, or instructions (e.g., a non-transitory computer-readable medium storing instructions executable by a processor) for identifying data associated with one or more first addresses within an address space associated with the memory system, transmitting a copy command to the memory system, where the copy command indicates that the memory system is to associate the data with one or more second addresses within the address space, and transmitting, after transmitting the copy command, an access command for at least a portion of the data to the memory system, where the access command is associated with a second address of the one or more second addresses.

Some cases of the method 1000 and the apparatus described herein may further include operations, features, circuitry, logic, means, or instructions for transmitting, to the memory system, a list of copy parameters associated with the copy command, where the list of copy parameters indicates the one or more first addresses, the one or more second addresses, or both.

In some instances of the method 1000 and the apparatus described herein, the copy command includes an indication of a length of the list of copy parameters.

In some cases of the method 1000 and the apparatus described herein, the data includes one or more blocks of data, and the list of copy parameters includes one or more block indicators each for a respective block of the one or more blocks.

In some instances of the method 1000 and the apparatus described herein, a block indicator of the one or more block indicators includes an indication of a respective start address within the address space for the respective block, an indication of a size of the respective block, or both.

In some examples of the method 1000 and the apparatus described herein, the list of copy parameters includes an indication of a quantity of information allocated to the one or more block indicators.

In some cases of the method 1000 and the apparatus described herein, the list of copy parameters includes an indication of a quantity of information included in the list of copy parameters, the quantity of information exclusive of the indication of the quantity.

In some instances of the method 1000 and the apparatus described herein, the list of copy parameters includes an indication of a start address within the one or more second addresses.

In some examples of the method 1000 and the apparatus described herein, the one or more second addresses includes a set of sequential addresses that begins with the start address indicated by the list of copy parameters.

Some cases of the method 1000 and the apparatus described herein may further include operations, features, circuitry, logic, means, or instructions for receiving, from the memory system, signaling responsive to the copy command, where transmitting the list of copy parameters may be based at least in part on receiving the signaling responsive to the copy command.

Some instances of the method 1000 and the apparatus described herein may further include operations, features, circuitry, logic, means, or instructions for receiving, from the memory system, signaling that indicates support by the memory system for copy commands, a maximum quantity of data that the memory system supports copying in response to a single copy command, a maximum quantity of block indicators that the memory system supports for a single copy command where the data includes one or more blocks of data each associated with a respective block indicator, a maximum quantity of data that the memory system supports being associated with a single block indicator, or any combination thereof.

In some instances of the method 1000 and the apparatus described herein, the copy command further indicates that the data may be to remain associated with the one or more first addresses after the data may be associated with the one or more second addresses.

In some cases of the method 1000 and the apparatus described herein, the copy command includes an operation code that may be specific to copy commands.

In some instances of the method 1000 and the apparatus described herein, the one or more first addresses include one or more first LBAs and the one or more second addresses include one or more second LBAs.

In some cases of the method 1000 and the apparatus described herein, the memory system may be allowed for a limited duration to transmit a busy status to the host based at least in part on the copy command (e.g., in response to receiving the copy command, based on executing one or more operations in response to the copy command).

It should be noted that the methods described above describe possible implementations, and that the operations and the steps may be rearranged or otherwise modified and that other implementations are possible. Further, portions from two or more of the methods may be combined.

An apparatus is described. The apparatus may include one or more memory devices and a controller coupled with the one or more memory devices. The controller may be configured to cause the apparatus to store, within the one or more memory devices, data associated with one or more first addresses within an address space, receive, from a host for the one or more memory devices, a copy command for the data, and associate, in response to the copy command, the data with one or more second addresses within the address space.

In some cases, the controller may further be configured to cause the apparatus to receive, from the host, a list of copy parameters associated with the copy command, where the list of copy parameters indicates the one or more first addresses, the one or more second addresses, or both.

In some examples of the apparatus, the copy command includes an indication of a length of the list of copy parameters.

In some instances of the apparatus, the data includes one or more blocks of data and the list of copy parameters includes one or more block indicators each for a respective block of the one or more blocks.

In some cases of the apparatus, a block indicator of the one or more block indicators includes an indication of a respective start address within the address space for the respective block, an indication of a size of the respective block, or both.

In some instances of the apparatus, the list of copy parameters includes an indication of a quantity of information allocated to the one or more block indicators.

In some cases of the apparatus, the list of copy parameters includes an indication of a quantity of information included in the list of copy parameters, the quantity of information exclusive of the indication of the quantity.

In some instances of the apparatus, the list of copy parameters includes an indication of a start address within the one or more second addresses.

In some examples, to associate the data with the one or more second addresses, the controller may further be configured to cause the apparatus to associate the data with a set of sequential addresses that begins with the start address indicated by the list of copy parameters.

In some cases, the controller may further be configured to cause the apparatus to transmit, to the host, signaling responsive to the copy command, where receiving the list of copy parameters may be based at least in part on transmitting the signaling responsive to the copy command.

In some instances, the controller may further be configured to indicate, to the host, support by the one or more memory devices for copy commands, a maximum quantity of data that the one or more memory devices support copying in response to a single copy command, a maximum quantity of block indicators that the one or more memory devices support for a single copy command where the data includes one or more blocks of data each associated with a respective block indicator, a maximum quantity of data that the one or more memory devices support being associated with a single block indicator, or any combination thereof.

In some cases of the apparatus, the copy command includes an operation code that is specific to (e.g., dedicated to, exclusive to) copy commands.

In some instances of the apparatus, the controller may be configured to allow the apparatus a limited duration in which to transmit a busy status to the host based at least in part on (e.g., after) receiving the copy command.

In some examples of the apparatus, the one or more memory devices may be or be included in a universal flash storage (UFS) device.

In some cases, the controller may further be configured to cause the apparatus to read, in response to the copy command, the data from a first set of memory cells associated with the one or more first addresses and write, in response to the copy command, a copy of the data to a second set of memory cells associated with the one or more second addresses.

In some instances of the apparatus, the one or more second addresses include one or more second logical addresses, and associating the data with the one or more second addresses includes updating one or more mapping tables within the memory array to associate the one or more second logical addresses with one or more second physical addresses corresponding to the second set of memory cells.

In some examples of the apparatus, the data remains stored at the first set of memory cells after the copy of the data has been written to the second set of memory cells.

In some cases of the apparatus, the one or more second addresses include one or more second logical addresses, and the data, prior to receiving the copy command, may be stored at a set of memory cells having one or more physical addresses, and associating the data with the one or more second addresses includes updating one or more mapping tables within the memory array to associate the one or more second logical addresses with the one or more physical addresses.

In some instances, the controller may further be configured to cause the apparatus to continue to store the data at the set of memory cells having the one or more physical addresses (e.g., after associating the data with the one or more second addresses), where the one or more first addresses include one or more first logical addresses and the one or more mapping tables, after the data may be associated with the one or more second addresses, associate the one or more physical addresses with both the one or more second logical addresses and the one or more first logical addresses.

In some cases, the controller may further be configured to cause the apparatus to maintain one or more second tables that associate the one or more first logical addresses with the one or more second logical addresses.

In some examples, the controller may further be configured to cause the apparatus to receive an access command for at least a portion of the data and check the one or more second tables based at least in part on receiving the access command, where the controller may be further configured to cause the apparatus to check based at least in part on a flag stored within the one or more mapping tables in association with a first logical address of the one or more first logical addresses or in association with a second logical address of the one or more second logical addresses, or where the controller may be further configured to cause the apparatus to check based at least in part on metadata stored in association with the at least the portion of the data.

Another apparatus is described. The apparatus may include a controller configured to couple with a memory system (e.g., one or more memory devices), where the controller is configured to cause the apparatus to identify data associated with one or more first addresses within an address space associated with the memory system, transmit a copy command to the memory system, where the copy command indicates that the memory system is to associate the data with one or more second addresses within the address space, and transmit, after transmitting the copy command, an access command for at least a portion of the data to the memory system, where the access command is associated with a second address of the one or more second addresses.

In some examples, the controller may further be configured to cause the apparatus to transmit, to the memory system, a list of copy parameters associated with the copy command, where the list of copy parameters indicates the one or more first addresses, the one or more second addresses, or both.

In some cases of the apparatus, the copy command includes an indication of a length of the list of copy parameters.

In some instances of the apparatus, the data includes one or more blocks of data and the list of copy parameters includes one or more block indicators each for a respective block of the one or more blocks.

In some cases of the apparatus, a block indicator of the one or more block indicators includes an indication of a respective start address within the address space for the respective block, an indication of a size of the respective block, or both.

In some instances of the apparatus, the list of copy parameters includes an indication of a quantity of information allocated to the one or more block indicators.

In some cases of the apparatus, the list of copy parameters includes an indication of a quantity of information included in the list of copy parameters, the quantity of information exclusive of the indication of the quantity.

In some instances of the apparatus, the list of copy parameters includes an indication of a start address within the one or more second addresses.

In some cases of the apparatus, the one or more second addresses includes a set of sequential addresses that begins with the start address indicated by the list of copy parameters.

In some examples, the controller may further be configured to cause the apparatus to receive, from the memory system, signaling responsive to the copy command, where transmitting the list of copy parameters may be based at least in part on receiving the signaling responsive to the copy command.

In some cases, the controller may further be configured to cause the apparatus to receive, from the memory system, signaling that indicates support by the memory system for copy commands, a maximum quantity of data that the memory system supports copying in response to a single copy command, a maximum quantity of block indicators that the memory system supports for a single copy command where the data includes one or more blocks of data each associated with a respective block indicator, a maximum quantity of data that the memory system supports being associated with a single block indicator, or any combination thereof.

In some instances of the apparatus, the copy command further indicates that the data may be to remain associated with the one or more first addresses after the data may be associated with the one or more second addresses.

In some examples of the cases, the copy command includes an operation code that may be specific to copy commands.

In some examples of the apparatus, the one or more first addresses include one or more first LBAs, and the one or more second addresses include one or more second LBAs.

In some cases of the apparatus, the memory system may be allowed for a limited duration to transmit a busy status to the apparatus based at least in part on receiving the copy command.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
store, within the one or more memory devices, data associated with one or more first addresses within an address space;
receive, from a host for the one or more memory devices, a copy command for the data, wherein the copy command comprises a numeric value that is representative of a quantity of bytes, the quantity of bytes being a length of a list of copy parameters associated with the copy command, the list of copy parameters to be received by the memory system subsequent to receipt of the copy command;
receive, from the host, the list of copy parameters after receiving the copy command, wherein the list of copy parameters comprises the one or more first addresses and one or more second addresses, and wherein the length of the list of copy parameters is equal to the quantity of bytes represented by the numeric value included in the copy command; and
associate, in response to the copy command, the data with the one or more second addresses within the address space.

2. The memory system of claim 1, wherein:
the data comprises one or more blocks of data; and
the list of copy parameters comprises one or more block indicators each for a respective block of the one or more blocks.

3. The memory system of claim 2, wherein a block indicator of the one or more block indicators comprises an indication of a respective start address within the address space for the respective block, an indication of a size of the respective block, or both.

4. The memory system of claim 2, wherein the list of copy parameters comprises an indication of a quantity of information allocated to the one or more block indicators.

5. The memory system of claim 1, wherein the list of copy parameters comprises an indication of a quantity of information included in the list of copy parameters, the quantity of information exclusive of the indication of the quantity.

6. The memory system of claim 1, wherein the list of copy parameters comprises an indication of a start address within the one or more second addresses.

7. The memory system of claim 6, wherein, to associate the data with the one or more second addresses, the processing circuitry is configured to cause the memory system to:
associate the data with a set of sequential addresses that begins with the start address indicated by the list of copy parameters.

8. The memory system of claim 1, wherein the copy command comprises an operation code that is specific to copy commands.

9. The memory system of claim 1, wherein the processing circuitry is configured to allow the memory system a limited duration in which to transmit a busy status to the host after receiving the copy command.

10. The memory system of claim 1, wherein the processing circuitry is further configured to cause the memory system to:

read, in response to the copy command, the data from a first set of memory cells associated with the one or more first addresses; and write, in response to the copy command, a copy of the data to a second set of memory cells associated with the one or more second addresses.

11. The memory system of claim 10, wherein:

the one or more second addresses comprise one or more second logical addresses; and associating the data with the one or more second addresses comprises updating one or more mapping tables within the memory system to associate the one or more second logical addresses with one or more second physical addresses corresponding to the second set of memory cells.

12. The memory system of claim 10, wherein the data remains stored at the first set of memory cells after the copy of the data is written to the second set of memory cells.

13. The memory system of claim 1, wherein:

the one or more second addresses comprise one or more second logical addresses;

the data, prior to receiving the copy command, is stored at a set of memory cells having one or more physical addresses; and associating the data with the one or more second addresses comprises updating one or more mapping tables within the memory system to associate the one or more second logical addresses with the one or more physical addresses.

14. The memory system of claim 13, wherein the processing circuitry is further configured to cause the memory system to:

continue to store the data at the set of memory cells having the one or more physical addresses, wherein:

the one or more first addresses comprise one or more first logical addresses; and the one or more mapping tables, after the data is associated with the one or more second addresses, associate the one or more physical addresses with both the one or more second logical addresses and the one or more first logical addresses.

15. A non-transitory computer-readable medium storing code comprising instructions that, when executed by one or more processors of an electronic device, cause the electronic device to:

store, within one or more memory devices, data associated with one or more first addresses within an address space;

receive, from a host for the one or more memory devices, a copy command for the data, wherein the copy command comprises a numeric value that is representative of a quantity of bytes, the quantity of bytes being a length of a list of copy parameters associated with the copy command, the list of copy parameters to be received subsequent to receipt of the copy command;

receive, from the host, the list of copy parameters after receiving the copy command, wherein the list of copy parameters comprises the one or more first addresses and one or more second addresses, and wherein the length of the list of copy parameters is equal to the quantity of bytes represented by the numeric value included in the copy command; and associate, in response to the copy command, the data with the one or more second addresses within the address space.

16. The non-transitory computer-readable medium of claim 15, wherein:

the data comprises one or more blocks of data; and the list of copy parameters comprises one or more block indicators each for a respective block of the one or more blocks.

17. The non-transitory computer-readable medium of claim 16, wherein a block indicator of the one or more block indicators comprises an indication of a respective start address within the address space for the respective block, an indication of a size of the respective block, or both.

18. The non-transitory computer-readable medium of claim 16, wherein the list of copy parameters comprises an indication of a quantity of information allocated to the one or more block indicators.

19. The non-transitory computer-readable medium of claim 15, wherein the list of copy parameters comprises an indication of a quantity of information included in the list of copy parameters, the quantity of information exclusive of the indication of the quantity.

20. The non-transitory computer-readable medium of claim 15, wherein the list of copy parameters comprises an indication of a start address within the one or more second addresses.

21. The non-transitory computer-readable medium of claim 20, wherein, to associate the data with the one or more second addresses, the instructions, when executed by the one or more processors of the electronic device, further cause the electronic device to:

associate the data with a set of sequential addresses that begins with the start address indicated by the list of copy parameters.

22. A method performed by a memory system comprising one or more memory devices, the method comprising:

storing, within the one or more memory devices, data associated with one or more first addresses within an address space;

receiving, from a host for the one or more memory devices, a copy command for the data, wherein the copy command comprises a numeric value that is representative of a quantity of bytes, the quantity of bytes being a length of a list of copy parameters associated with the copy command, the list of copy parameters to be received by the memory system subsequent to receipt of the copy command;

receiving, from the host, the list of copy parameters after receiving the copy command, wherein the list of copy parameters comprises the one or more first addresses and one or more second addresses, and wherein the length of the list of copy parameters is equal to the quantity of bytes represented by the numeric value included in the copy command; and associating, in response to the copy command, the data with the one or more second addresses within the address space.

23. An apparatus, comprising:

processing circuitry configured to couple with a memory system, wherein the processing circuitry is configured to cause the apparatus to:

identify data associated with one or more first addresses within an address space associated with the memory system;

transmit a copy command to the memory system, wherein the copy command indicates that the memory system is to associate the data with one or more second addresses within the address space, and wherein the copy command comprises a numeric value that is representative of a quantity of bytes, the quantity of bytes being a length of a list of copy parameters associated with the copy command, the list of copy parameters to be transmitted to the memory system subsequent to transmission of the copy command;

transmit, to the memory system, the list of copy parameters after transmitting the copy command, wherein the list of copy parameters comprises the one or more first addresses and the one or more second addresses, and wherein the length of the list of copy parameters is equal to the quantity of bytes represented by the numeric value included in the copy command; and transmit, after transmitting the copy command, an access command for at least a portion of the data to the memory system, wherein the access command is associated with a second address of the one or more second addresses.

24. The apparatus of claim 23, wherein:

the data comprises one or more blocks of data; and the list of copy parameters comprises one or more block indicators each for a respective block of the one or more blocks.

25. The apparatus of claim 24, wherein a block indicator of the one or more block indicators comprises an indication of a respective start address within the address space for the respective block, an indication of a size of the respective block, or both.

26. The apparatus of claim 24, wherein the list of copy parameters comprises an indication of a quantity of information allocated to the one or more block indicators.

27. The apparatus of claim 23, wherein the list of copy parameters comprises an indication of a start address within the one or more second addresses.

28. A non-transitory computer-readable medium storing code comprising instructions, which when executed by one or more processors of an electronic device, cause the electronic device to:

identify data associated with one or more first addresses within an address space associated with a memory system;

transmit a copy command to the memory system, wherein the copy command indicates that the memory system is to associate the data with one or more second addresses within the address space, and wherein the copy command comprises a numeric value that is representative of a quantity of bytes, the quantity of bytes being a length of a list of copy parameters associated with the copy command, the list of copy parameters to be transmitted to the memory system subsequent to transmission of the copy command;

transmit, to the memory system, the list of copy parameters after transmitting the copy command, wherein the list of copy parameters comprises the one or more first addresses and the one or more second addresses, and wherein the length of the list of copy parameters is equal to the quantity of bytes represented by the numeric value included in the copy command; and transmit, after transmitting the copy command, an access command for at least a portion of the data to the memory system, wherein the access command is associated with a second address of the one or more second addresses.

* * * * *